US012718229B2

(12) United States Patent
Doney

(10) Patent No.: US 12,718,229 B2
(45) Date of Patent: *Aug. 25, 2026

(54) METHOD, APPARATUS, AND COMPUTER-READABLE MEDIUM FOR CONFEDERATED RIGHTS AND HIERARCHICAL KEY MANAGEMENT

(71) Applicant: DTCC DIGITAL (US) INC., Jersey City, NJ (US)

(72) Inventor: George Daniel Doney, Riva, MD (US)

(73) Assignee: DTCC DIGITAL (US) INC., Jersey City, NJ (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/953,902

(22) Filed: Nov. 20, 2024

(65) Prior Publication Data

US 2025/0078065 A1 Mar. 6, 2025

Related U.S. Application Data

(63) Continuation of application No. 18/369,558, filed on Sep. 18, 2023, now Pat. No. 12,190,314, which is a continuation-in-part of application No. 17/344,275, filed on Jun. 10, 2021, now Pat. No. 11,954,212.

(60) Provisional application No. 63/037,034, filed on Jun. 10, 2020.

(51) Int. Cl.

| | |
|---|---|
| ***G06Q 20/36*** | (2012.01) |
| ***G06Q 20/02*** | (2012.01) |
| ***G06Q 20/38*** | (2012.01) |
| ***H04L 9/00*** | (2022.01) |
| ***H04L 9/40*** | (2022.01) |

(52) U.S. Cl.
CPC ......... *G06Q 20/3674* (2013.01); *G06Q 20/02* (2013.01); *G06Q 20/3825* (2013.01); *H04L 9/50* (2022.05); *H04L 63/0884* (2013.01)

(58) Field of Classification Search
CPC .................. G06F 21/604; G06F 16/27; G06F 2221/2141; G06Q 20/3674; G06Q 20/38215; G06Q 20/3825; G06Q 20/3829; G06Q 20/389; G06Q 20/4016; H04L 9/0894; H04L 9/3247; H04L 9/50
See application file for complete search history.

(56) References Cited

U.S. PATENT DOCUMENTS

| | | | |
|---|---|---|---|
| 10,489,597 | B2 | 11/2019 | Safford et al. |
| 10,540,654 | B1 | 1/2020 | James et al. |
| 10,673,626 | B2 | 6/2020 | Sandberg-Maitland et al. |

(Continued)

OTHER PUBLICATIONS

Pal, Shantanu, et al. "On the design of a flexible delegation model for the Internet of Things using blockchain." IEEE Transactions on Industrial Informatics 16.5 (2019): 3521-3530. (Year: 2019).

*Primary Examiner* — Techane Gergiso
(74) *Attorney, Agent, or Firm* — Neo IP

(57) ABSTRACT

A method and apparatus for secured, peer-to-peer transfer of data rights over a computer network, the method being accomplished by a distributed computing system including a distributed ledger platform. Root rights are defined and delegated to wallets in a multilevel manner to thereby isolate wallets associated with the root right from cyber risk. Root rights are revokable and reassignable, where a root wallet is able to claw back authority delegated to one or more supervisory wallets.

20 Claims, 10 Drawing Sheets

(56) References Cited

U.S. PATENT DOCUMENTS

| | | | |
|---|---|---|---|
| 10,735,202 | B2 | 8/2020 | Jayachandran et al. |
| 11,159,307 | B2 | 10/2021 | Bathen et al. |
| 11,200,569 | B1 | 12/2021 | James et al. |
| 11,250,423 | B2 | 2/2022 | Heyner |
| 11,250,466 | B2 | 2/2022 | Soundararajan et al. |
| 11,308,487 | B1 | 4/2022 | Foster et al. |
| 11,514,448 | B1 * | 11/2022 | Liberman ............ G06Q 20/389 |
| 11,755,998 | B2 | 9/2023 | Malvankar et al. |
| 11,862,306 | B1 * | 1/2024 | Goldberg .............. H04L 9/0637 |
| 2019/0166133 | A1 | 5/2019 | Frederick et al. |
| 2019/0173854 | A1 * | 6/2019 | Beck ....................... H04L 67/10 |
| 2019/0229931 | A1 | 7/2019 | Uzelac |
| 2019/0372786 | A1 | 12/2019 | Ra et al. |
| 2020/0034457 | A1 | 1/2020 | Brody et al. |
| 2020/0067907 | A1 * | 2/2020 | Avetisov ............... H04L 67/133 |
| 2020/0117690 | A1 | 4/2020 | Tran et al. |
| 2020/0151842 | A1 | 5/2020 | O'brien |
| 2020/0210998 | A1 | 7/2020 | So et al. |
| 2020/0225649 | A1 | 7/2020 | Cahill |
| 2020/0226123 | A1 | 7/2020 | Nixon et al. |
| 2020/0250176 | A1 | 8/2020 | Padmanabhan |
| 2020/0250295 | A1 | 8/2020 | Padmanabhan |
| 2020/0320417 | A1 | 10/2020 | Corning |
| 2020/0327629 | A1 | 10/2020 | Spangenberg et al. |
| 2020/0334674 | A1 | 10/2020 | Youngblood et al. |
| 2020/0334773 | A1 | 10/2020 | Spangenberg et al. |
| 2020/0344132 | A1 | 10/2020 | Padmanabhan |
| 2020/0344233 | A1 | 10/2020 | Lai et al. |
| 2020/0379977 | A1 | 12/2020 | Saket et al. |
| 2020/0382301 | A1 | 12/2020 | Saket et al. |
| 2020/0394648 | A1 | 12/2020 | Blackshear et al. |
| 2021/0377263 | A1 | 12/2021 | Law |
| 2021/0390191 | A1 | 12/2021 | Doney |
| 2022/0051261 | A1 | 2/2022 | Vetas |
| 2022/0101326 | A1 | 3/2022 | Kim et al. |
| 2024/0005307 | A1 | 1/2024 | Doney |

* cited by examiner

METHOD, APPARATUS, AND COMPUTER-READABLE MEDIUM FOR CONFEDERATED RIGHTS AND HIERARCHICAL KEY MANAGEMENT

CROSS REFERENCES TO RELATED APPLICATIONS

This application is related to and claims priority from the following U.S. patent applications. This application is a continuation of U.S. application Ser. No. 18/369,558, filed Sep. 18, 2023, which is a continuation-in-part of U.S. application Ser. No. 17/344,275, filed Jun. 10, 2021, which claims priority to and the benefit of U.S. Provisional Application No. 63/037,034, filed Jun. 10, 2020, each of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

The official copy of the Computer Program Listing is submitted concurrently with the specification as a TXT formatted file via EFS-Web, with a file name of "4534029-20230913-Computer-Program-Listing-Appendix.txt", a creation date of Sep. 13, 2023, and a size of 409 kilobytes. The Computer Program Listing filed via EFS-Web is part of the specification and is incorporated in its entirety by reference herein.

BACKGROUND OF THE INVENTION

1. Field of the Invention

The present invention relates to distributed ledger technologies, and more specifically to the secure delegation of a right relating to an asset on a distributed ledger.

2. Description of the Prior Art

It is generally known in the prior art to provide a computer platform including security measures for use with a distributed ledger.

Prior art patent documents include the following:

US Patent Publication No. 2022/0051261 for Processes and systems of blockchain with verification through a consortium of stakeholders by inventor Vetas, filed May 29, 2021, and published Feb. 17, 2022, is directed to a management system having a blockchain structure. The system includes a consortium of stakeholder computers connected to a platform. The consortium of stakeholders providing user inputted data associated with product providence. The platform is integrated with a blockchain database to verify and manage user inputted data. The platform is configured to validate and assign values to the user inputted data to connect to related data within the blockchain database. A user interface is configured to display qualified data based on user search queries and focus search results to provide a roadmap of the data relevant to a particular product or value.

US Patent Publication No. 2021/0377263 for Distributed computing systems for strong user authentication and related methods by inventor Law, filed Apr. 22, 2021, and published Dec. 2, 2021, is directed to a distributed computing system is used to form a login network to verify the identity of users. The login network uses biometric authentication on a user device to digitally sign a payload, which is sent to the login network for verification. The login network executes the verification using blockchain computing architecture, which is decentralized. The login network provides strong customer authentication, decentralization of data and authentication, a trusted identity service, and privacy and control of the user data by the user.

U.S. Pat. No. 11,250,466 for Systems and methods for using secured representations of user, asset, and location distributed ledger addresses to prove user custody of assets at a location and time by inventor Soundararajan, filed Jul. 30, 2018, and issued Feb. 15, 2022, is directed to systems and methods for using a distributed ledger network and devices that transmit secured representations of distributed ledger addresses to prove the custody of an asset by a user at a particular location and time. In some implementations, a method includes: transmitting to a server system operating as a node on a distributed ledger network: a first secured representation of a distributed ledger address associated with a first location; a second secured representation of a distributed ledger address associated with an asset; and a third secured representation of a distributed ledger address associated with a user; and receiving a confirmation message from the server system.

U.S. Pat. No. 11,250,423 for Encapsulated security tokens for electronic transactions by inventor Heyner, filed Aug. 22, 2019, and issued Feb. 15, 2022, is directed to functional data for use in one or more digital transactions secured by using an encapsulated security token (EST). In certain embodiments, the EST is created by encapsulating digital data including the functional data using at least two cryptographic systems of two parties. The encapsulation and subsequent de-encapsulation can utilize cryptographic systems of the parties that involve a private key for signing and decryption and a public key for encryption and signature verification. If constructed carefully over a series of rigorous events, the resulting EST can be practically impossible to counterfeit. In addition, a propagation of rights can be tracked for auditing and rights can be easily terminated or modified.

U.S. Pat. No. 11,159,307 for Ad-hoc trusted groups on a blockchain by inventor Bathen, filed Aug. 8, 2018, and issued Oct. 26, 2021, is directed to an example operation may include one or more of identifying a group of blockchain member devices attempting to establish a trusted group communication channel, assigning each of the blockchain member devices public/private key pairs, publishing the public keys of the blockchain member devices in a list, identifying a request from a first blockchain member device requesting a private key, associated with a second blockchain member device, be applied to a predetermined nonce value, responsive to identifying a response to the request, verifying, via a public key assigned to the first blockchain member device, that the second blockchain member device is a trusted member of the group of blockchain member devices, and responsive to verifying the second blockchain member device is a trusted member of the group of blockchain member devices, permitting communication between the first blockchain member device and the second blockchain member device on the trusted group communication channel.

U.S. Pat. No. 10,735,202 for Anonymous consent and data sharing on a blockchain by inventor Jayachandran, filed Jul. 24, 2017, and issued Aug. 4, 2020, is directed to an example operation may include one or more of storing a user profile in a blockchain by an authorized member of the blockchain, receiving a request by another authorized member of the blockchain to access the user profile, identifying the request for the user profile is from the another authorized member of the blockchain, creating a signed message that includes consent to share the user profile with the another authorized member of the blockchain, and transmitting the signed message to the another authorized member of the blockchain, and wherein an exchange of the user profile between the blockchain members is performed without revealing blockchain member identities of the authorized member of the blockchain and the another authorized member of the blockchain to any of the blockchain members.

U.S. Pat. No. 10,673,626 for Threshold secret share authentication proof and secure blockchain voting with hardware security modules by inventor Sandberg-Maitland, filed Dec. 31, 2018, and issued Jun. 2, 2020, is directed to an encryption-protected decentralized and replicated blockchain file storage system maintained and managed by a channel of peers, the invention creates the additional levels of trust that are needed for peer voter authentication and transaction proposal endorsement. The invention effectively excludes hostile agents from influencing or impersonating legitimate voter peers through the mathematical strength of the K-of-N mechanism based on secret sharing with cryptographic hashing. In a further embodiment an extension to nested signatures is disclosed to enforce signing order.

U.S. Pat. No. 10,489,597 for Blockchain verification of network security service by inventor Safford, filed Mar. 28, 2017, and issued Nov. 26, 2019, is directed to a system may include a communication port to exchange information with a client device associated with an industrial control system. A network security server coupled to the communication port may include a computer processor adapted to provide a network security service for the client device. The computer processor may further be adapted to record security information about the client device via a blockchain verification process (e.g., by registering a validation result within a distributed ledger). The network security service might comprise, for example, an integrity attestation service providing software verification for the client device.

SUMMARY OF THE INVENTION

The present invention relates to the distribution of rights associated with a wallet on a distributed ledger. The rights are confederated and the delegation of the right to a wallet is revokable and reassignable.

It is an object of this invention to provide a method and system including a computer platform for delegating rights on a distributed ledger that allows the owner of a tokenized asset to deputize a secondary wallet to perform the functions associated with a root wallet containing the tokenized asset. In this way, use of the root wallet is minimized, and a secondary wallet is able to perform the functions associated with the root wallet.

In one embodiment, the present invention includes a method for delegation of a confederated right on a distributed ledger, including a root wallet executing a smart contract on a distributed ledger to execute and record a root right, the root wallet executing a smart contract on a distributed ledger to execute and record an immutable right, wherein the immutable right contains authorization to perform at least one function associated with the root right, the root wallet delegating the immutable right from the root wallet to a delegate wallet on the distributed ledger to create a delegate right, wherein the delegate right enables the delegate wallet to have a right to perform at least one delegate function corresponding to the at least one function associated with the root right, wherein the delegate right is revokable and/or reassignable by the root wallet, and the root wallet recording a data entry in a delegation registry, wherein the delegation registry records the delegation of the immutable right from the root wallet to the delegate wallet.

In another embodiment, the present invention includes a system for delegation of confederated rights on a distributed ledger, including a decentralized computer platform including a processor, a memory, and at least one smart contract executable on a distributed ledger, wherein a root wallet contains a tokenized asset, wherein the root wallet and the tokenized asset are created via the decentralized computer platform and are located on the distributed ledger, wherein the root wallet accesses the distributed ledger and deploys a smart contract to execute and record a root right, wherein the root right includes at least one function to allow signing a transaction for the asset, at least one function to indicate the authorization to execute a function, and at least one function to allow creating an attribute associated with the asset, wherein the root wallet deploys at least one smart contract to execute and record at least one core role, wherein the at least one core role includes at least one function associated with the root right, wherein the root wallet deploys at least one smart contract to execute and record at least one system wallet, wherein the system wallet is authorized to assign at least one core role to at least one delegate wallet, wherein the core role contains an immutable right including the at least one function to allow signing a transaction for the asset, the at least one function to indicate the authorization to execute a function, and/or the at least one function to allow creating an attribute associated with the asset, and wherein the at least one delegate wallet is authorized to sign a transaction for the asset, execute a function, and/or create an attribute associated with an asset.

In yet another embodiment, the present invention includes a method for distribution of a confederated right on a distributed ledger, including a root wallet executing a smart contract on a distributed ledger to execute and record a root right, wherein the root right includes at least one function to allow signing a transaction for the asset, at least one function to indicate the authorization to execute a function, and at least one function to allow creating an attribute associated with the asset, the root wallet assigning a system role attestation to a system wallet, wherein the system role attestation is saved as a system attribute in an attribute registry, the system wallet executing a smart contract for creating at least one role attestations, the system wallet assigning the at least one role attestation to a delegate wallet, wherein the at least one role attestation includes at least one function associated with the root right, including the at least one function to allow signing a transaction for the asset, the at least one function to indicate the authorization to execute a function, and/or the at least one function to allow creating an attribute associated with the asset, saving the at least one role attestation as a role attribute in the attribute registry, the system wallet recording a data entry in the attribute registry, wherein the attribute registry records the attribution of the at least one role attestation from the system wallet to the delegate wallet, the delegate wallet creating an attribute, wherein the attribute is stored in the attribute registry, the delegate wallet creating a context, wherein the context is stored in a context registry, wherein only the delegate wallet is authorized to modify the attribute stored within the context, the delegate wallet creating a policy, wherein the policy is stored in a policy registry, and the delegate wallet developing a smart contract object, wherein the smart contract object is stored in a contract registry.

These and other aspects of the present invention will become apparent to those skilled in the art after a reading of the following description of the preferred embodiment when considered with the drawings, as they support the claimed invention.

DETAILED DESCRIPTION

Figure 1:
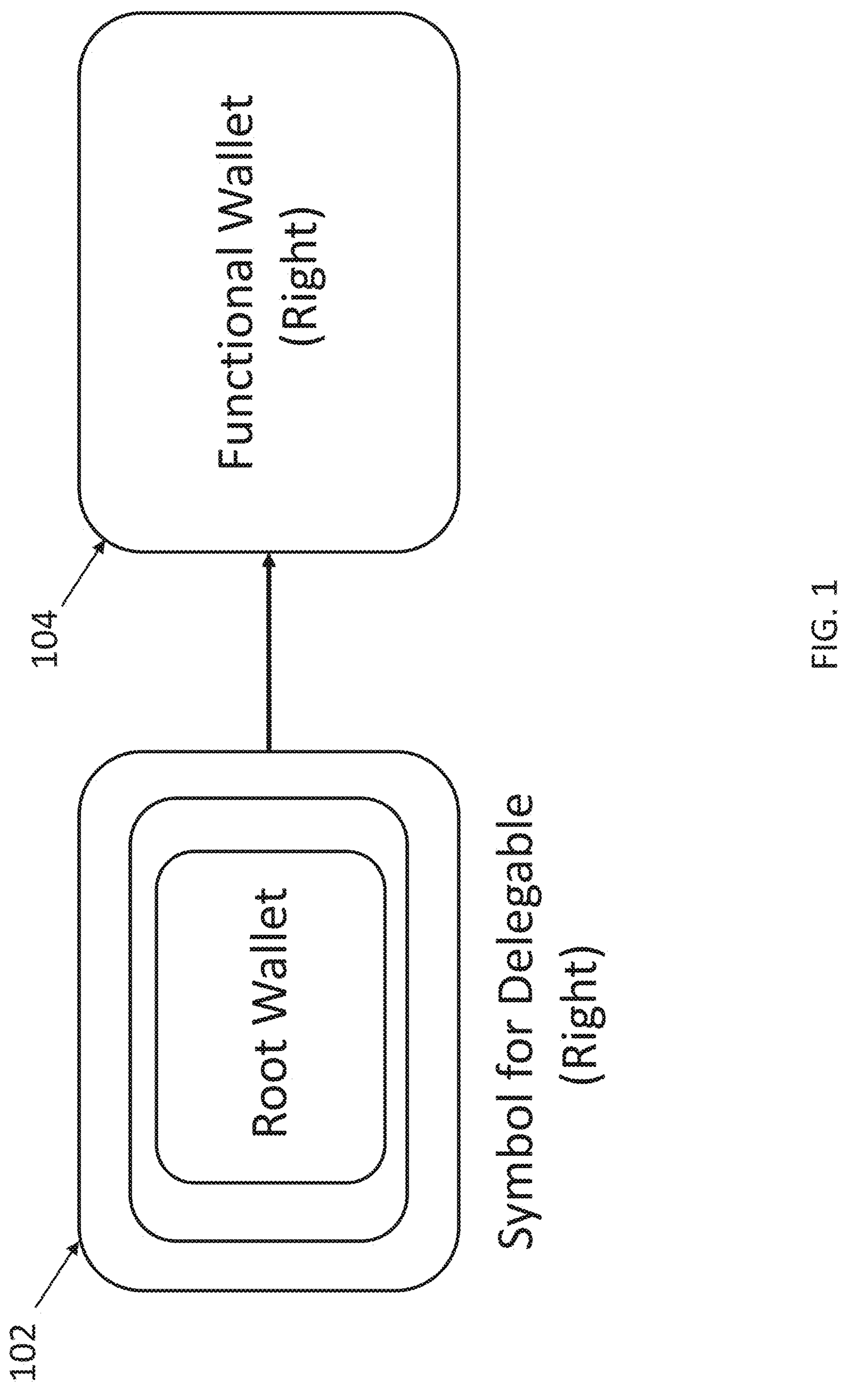
FIG. 1 illustrates an example of symbology used herein to depict a root right and delegation structure according to one embodiment of the present invention.

The present invention is generally directed to the distribution of rights associated with a wallet on a distributed ledger. The rights are confederated and the delegation of the right to a wallet is revokable and reassignable.

In one embodiment, the present invention includes a method for delegation of a confederated right on a distributed ledger, including a root wallet executing a smart contract on a distributed ledger to execute and record a root right, the root wallet executing a smart contract on a distributed ledger to execute and record an immutable right, wherein the immutable right contains authorization to perform at least one function associated with the root right, the root wallet delegating the immutable right from the root wallet to a delegate wallet on the distributed ledger to create a delegate right, wherein the delegate right enables the delegate wallet to have a right to perform at least one delegate function corresponding to the at least one function associated with the root right, wherein the delegate right is revokable and/or reassignable by the root wallet, and the root wallet recording a data entry in a delegation registry, wherein the delegation registry records the delegation of the immutable right from the root wallet to the delegate wallet.

In another embodiment, the present invention includes a system for delegation of confederated rights on a distributed ledger, including a decentralized computer platform including a processor, a memory, and at least one smart contract executable on a distributed ledger, wherein a root wallet contains a tokenized asset, wherein the root wallet and the tokenized asset are created via the decentralized computer platform and are located on the distributed ledger, wherein the root wallet accesses the distributed ledger and deploys a smart contract to execute and record a root right, wherein the root right includes at least one function to allow signing a transaction for the asset, at least one function to indicate the authorization to execute a function, and at least one function to allow creating an attribute associated with the asset, wherein the root wallet deploys at least one smart contract to execute and record at least one core role, wherein the at least one core role includes at least one function associated with the root right, wherein the root wallet deploys at least one smart contract to execute and record at least one system wallet, wherein the system wallet is authorized to assign at least one core role to at least one delegate wallet, wherein the core role contains an immutable right including the at least one function to allow signing a transaction for the asset, the at least one function to indicate the authorization to execute a function, and/or the at least one function to allow creating an attribute associated with the asset, and wherein the at least one delegate wallet is authorized to sign a transaction for the asset, execute a function, and/or create an attribute associated with an asset.

In yet another embodiment, the present invention includes a method for distribution of a confederated right on a distributed ledger, including a root wallet executing a smart contract on a distributed ledger to execute and record a root right, wherein the root right includes at least one function to allow signing a transaction for the asset, at least one function to indicate the authorization to execute a function, and at least one function to allow creating an attribute associated with the asset, the root wallet assigning a system role attestation to a system wallet, wherein the system role attestation is saved as a system attribute in an attribute registry, the system wallet executing a smart contract for creating at least one role attestations, the system wallet assigning the at least one role attestation to a delegate wallet, wherein the at least one role attestation includes at least one function associated with the root right, including the at least one function to allow signing a transaction for the asset, the at least one function to indicate the authorization to execute a function, and/or the at least one function to allow creating an attribute associated with the asset, saving the at least one role attestation as a role attribute in the attribute registry, the system wallet recording a data entry in the attribute registry, wherein the attribute registry records the attribution of the at least one role attestation from the system wallet to the delegate wallet, the delegate wallet creating an attribute, wherein the attribute is stored in the attribute registry, the delegate wallet creating a context, wherein the context is stored in a context registry, wherein only the delegate wallet is authorized to modify the attribute stored within the context, the delegate wallet creating a policy, wherein the policy is stored in a policy registry, and the delegate wallet developing a smart contract object, wherein the smart contract object is stored in a contract registry.

One aspect of the invention is a method for secure authorization of data transactions represented as state changes in a decentralized computing network including a distributed ledger platform, the method comprising: creating a root right expressed in smart contract code executing on the decentralized computing network, the root right permitting the execution of specified functions to thereby create an immutable right; delegating a right to permit at least one of the specified functions from the root right to a wallet on the decentralized network to create a delegated right allowing the wallet to have rights to sign transactions corresponding to the at least one of the functions, wherein the delegated right can be revoked or reassigned by the root right; recording a data structure in a delegation registry that represents the delegating of a right; and authorizing a transaction on the decentralized computing network by signing the transaction with the wallet to thereby exercise the wallet rights.

None of the prior art discloses the delegation of a confederated right to a delegate wallet on the blockchain, wherein the root wallet delegating the right is able to claw back the authority granted to a delegate wallet.

Decentralized networks provide a powerful baseline for trustless transactions between parties. The distributed ledger technology (DLT) of the decentralized networks provide both consensus immutability and decentralized authority for digitized financial ecosystems. The immutability of the consensus of transactions and accounts within the DLT network allow for certainty of transactions that have been recorded. In addition, the decentralized authority of DLT enables actors to execute their rights without the need for intermediaries such as banks and government institutions.

However, commerce in a complex, digital financial ecosystem requires more than just consensus immutability and decentralized authority. Computer networking infrastructures must be augmented to incorporate elements of trust and authority that are inherent in disclosures and representations of value, thereby creating a trustless transaction network. Further, the trustless transaction networks must include implied permissions in a group context and enable collaboration between entities. Consider a basic trustless blockchain instruments, such as Bitcoin. These basic trustless blockchain instruments are bearer instruments, meaning only the party possessing the secret to a public address containing the instrument is able to exercise ownership on this value (e.g., the right to transmit the value). The bearer instrument model allows a network to conduct transactions of any size without intermediaries, thereby ensuring that these transactions are censorship free. However, there is no recourse in the event of lost or misappropriated custody. If the key to a "wallet" (a public/private key combination used to affect state changes on a distributed ledger) is lost or stolen, there is no mechanism for value recovery. There is therefore a need to create a computer platform that is operable to delegate access rights and authorization to additional parties to extend transfer, access, and ownership functions beyond the owner wallet associated with the asset.

Further, due to the irreversibility of blockchain transactions, recovery of stolen value is difficult if not impossible. Bearer instruments such as cryptocurrency are the preferred currency for digital extortion methods, such as "ransomware" attacks, where an attacking party encrypts the data associated with a victimized party and only provides the decryption key for the ransomed data upon a transfer of cryptocurrency to a wallet associated with the attacker. As a result, owners of blockchain value often turn to custodians to protect their value. When owners turn to intermediaries, the decentralized network becomes centralized, negating the purpose of the DLT implemented by the blockchain.

There is therefore a need for a system for defining and exercising curation rights (e.g., a mechanism to reverse illicit transactions or recover lost value among other things) while retaining consensus immutability and decentralized authority. Extending a trustless system to incorporate trust requires a layered rights governance structure that allows independent entities to define, share, and transact via rights, policies, and contracts. The present invention discloses a network architecture and data model designed to prevent rights from being extinguished by force, by theft, or by accident. The present invention enable participants to conduct transactions without intermediaries, thus preserving the benefits of decentralized networks, while protecting against cyber threats and providing recourse in the event of theft or misappropriation of the value. The present invention leverages hierarchical key management and confederated rights management to accomplish this. The hierarchical key management mechanism mitigates or eliminates cyber threats for recovery of core rights, while the confederated rights management is accomplished by a computer framework which establishes, conveys, and enforces rights without a central authority. These two innovations are configured to cooperate via the present invention to provide a decentralized computer network overcoming limitations of the prior art.

The present invention introduces a transfer agent to a computer platform for delegating rights on a decentralized network. A transfer agent module introduces a portal to the computer platform wherein a transfer agent, that is, a party who has the right to reverse a transaction or "claw-back" value for an illicit or mistaken transaction, accesses the system and executes commands to reverse a transaction. Additionally, the present invention includes a mechanism for determination of the right to reverse a transaction for a particular asset. The transfer agent module notifies a stakeholder that a party has been given a transfer agent right and that the party given the transfer agent right is trustworthy and qualified (e.g., has a legal right, can be held accountable if the right is misused, and is fully aware of responsibilities). The present invention further addresses the possibility that the transfer agent is compromised, becomes insolvent, or is incompetent.

To accomplish this, the present invention has developed a deeper approach to rights in general wherein the rights are configured to be applied broadly across any context. Confederated rights management, a technical approach that allows parties to form coalitions (groups of two or more parties who agree to define and apply a right voluntarily) rather than through centralized or federated models, are disclosed herein. Confederated rights management protects the decentralized benefits of blockchain while allowing coalitions to form and dissolve freely.

It is important to understand the difference between "federated" and "confederated" management models. In federated rights models, parties join in an arrangement where sovereignty, the ability to define and assign rights, rests with the newly created entity. Confederated models, on the other hand, are characterized by a coalition approach where parties are free to agree or disagree on the definition or assignment of rights. In confederated models, constituents need only agree on what it means to be a right and how a right is conveyed in order to transact with each other effectively. Parties in a confederated model are free to join common definitions and control of rights and are equally free to disagree or leave any control model.

A blockchain network is an example of a simple confederated rights model. The basic right encoded in blockchain networks is the right to sign a transaction (i.e., the right to authorize a state change in the network). By participating, constituents agree, at least implicitly, to the basic structure by which rights are expressed and conveyed, known as network governance. However, collaboration requires trust, which requires a framework built on top of trustless distributed ledger systems to enable trust to be conveyed between parties. A confederated rights model in accordance with the present invention supports, but does not mandate, federation, i.e., binding agreements between parties in a coalition that cannot be exited without consequence. But the development of lasting, large scale rights requires a mechanism by which coalitions can quickly form and dissolve coalition agreements to achieve mutual benefit.

In a confederated rights framework of the present invention, any assignment of rights or trustworthiness is relative. Participants decide whether a particular right, policy, contract, or object is managed in a way that benefits the participant. This requires the invention of a technology protocol and data model that enables attributes, policies, contracts, entities (individuals or groups), and objects to be defined by the coalition.

The confederated rights management approach applies a transfer agent right in one embodiment of the present invention. Within the context of a cryptographic token, or other digital token, a transfer agent right is applied by a responsible party. On creation of a token, the default party is the issuer, also known as the creator, who has the right to manage rights within the context of a token. Only qualified parties may obtain the issuer right. The issuer may transfer the right to manage rights to the token holders, who may exercise their rights through a consensus vote or a self-sovereign token model. The holder of the manager right assigns a transfer agent from a list of candidates who have been qualified to hold the right. In one embodiment, the qualification process for issuers and transfer agents is implemented in its own confederated model. If compromised or ineffective, the transfer agent role is reassigned by the party holding the manager right.

In the event that the party holding the manager right (referred to herein as a "root" right in the context of a token) is compromised, resolving the root right challenge requires an innovative technical mechanism to protect against compromise or loss of a root right. The solution needs to solve the custody paradox: the fact that all network actions present cyber and operational risk but infrequent actions limit utility of function. That is to say, the less a right is exercised, the less vulnerable the right is to cyber-attacks. In other words, the only safe right is one that is never used. This custody paradox has made the blockchain industry difficult to insure as cyber risk is nearly impossible to assess. The principal solution to mitigate cyber risk is exercising authority through signing ceremonies, a high assurance process that involves independent entities participating together in secure locations in authorizing a transaction. But this process is slow and expensive in order to mitigate cyber risk. Making the process faster introduces risk. This problem has limited the utility of blockchain because there is no middle ground between wallets that are "hot" (i.e., wallets that conduct fast and risky transactions) or "cold" (i.e., wallets that conduct slow and expensive transactions).

The present invention advantageously addresses this issue through the use of "layered wallets" to resolve the paradox through delegation. Through such delegation, a root wallet remains inactive while delegating its authority, repeatedly if needed, to wallets that accept the cyber risk required to sign a transaction. The authority is reclaimed from a party to whom authority has been delegated in the event of compromise or misuse of a delegated right by the party to whom authority has been delegated. Layering enables the expression of authority via hot wallet for fast and reversible transactions, which, if compromised, is recovered or reversed by exercising authority via a cold wallet. The only requirement for the exercise of authority from the cold wallet is recovery of the delegated right in the event of compromise, which presumably occurs infrequently. If recovery is frequent, the delegation model is repeated as often as necessary to ensure that the root is unlikely to ever be used. This model assumes that the root is stored with the highest level of assurance. Since the structure of the computer platform of the present invention prevents the use of the root right use, cyber risk is mitigated limiting the risk exposure of transaction participants.

The present invention leverages "cryptocurrency wallets" and "smart contracts." A cryptocurrency wallet, referred to herein as a "wallet" or an "address" is a device, physical medium, program, or a service which stores the public and/or private keys for cryptocurrency transactions. A wallet is created through the generation of a theoretical or random number with a length depending on the algorithm size. The number is then converted to a private key using the specific requirements of the cryptocurrency cryptography algorithm requirement. A wallet secret as used herein refers to the private key of a wallet, a username and/or password for logging into a wallet, and or any other private access mechanism accessible only to the owner of the wallet. A public key is then generated from the private key using the required cryptographic algorithm. The private key is private to the owner and is utilized by the owner to access and send cryptocurrency, whereas the public key is shared to any third party to enable the party to deliver cryptocurrency to the owner. "Smart contracts," are executable code stored and executed at least in part on a decentralized network such as a blockchain. Within a smart contract, the right for the owner of a wallet (i.e., a party or parties who possess the secret required to sign a transaction) to perform a function (i.e., cause a state change on a distributed ledger of the network) is determined by code. The code evaluates the right to perform a function based on data that is written immutably on the distributed ledger. For example, a party may desire to send tokens from one distributed ledger address to another (e.g., a state change affected by executing the ERC-20 "TransferFrom" function on the Ethereum ledger). On posting the signed transaction to the source distributed ledger, the signer's right to execute the function is determined by the smart contract code by, for example, consulting with a list of addresses authorized to conduct transfers. One of ordinary skill in the art will appreciate that this list is data stored on the distributed ledger and managed by an authorizing party for transactions. When a transaction is signed, the smart contract validates that the signer is an authorized party based on a match between the public address of the signer and the data defining the right.

In addition to the right to authorize transactions, the present invention advantageously addresses the authorization of token issuance, (i.e., the right to create new units of a token). The party who holds this right has a responsibility to all tokenholders (i.e., one or more owners of the tokens and their associated wallets) to exercise the right only under authorized conditions to prevent undesirable dilution of tokenholder value. In some embodiments, the token creator (i.e., the party that signed the transaction that deployed the Token's smart contract) is afforded the right to issue more tokens. On creation, the token smart contract may store data recording the token creator's public address. When the Issue function is called, the smart contract evaluates whether the signer is the creator's address, and, if so, allows the transaction to proceed. The table and pseudocode below illustrate this functionality.

| Internal Storage | |
|---|---|
| | Value |
| Creator | 0x1234 |

```
function issue(address signer, unit amount) {
  if (signer==Creator) {
    //do something
  } else
  {throw error;}
}
```

This basic pseudocode is common in role based systems. With the power of immutability and decentralized authority afforded by decentralized networks, this simple sequence provides considerable flexibility to manage rights without a centralized administrator. However, this power could result in unrecoverable loss (e.g., value dilution) if the address associated with a right is lost or compromised. If the secret to the wallet associated with the creator right is lost or stolen, no party will be able to perform the desired function, potentially rendering the asset associated with the smart contract useless and the value of the asset is lost. Each time the creator exercises its authority (signs a transaction), there is a possibility of key compromise due to cyber-attack. These important system rights, including but not limited to allowing an owner of a wallet to exercise authority, accessing the asset in the wallet using the private key of the wallet, creating one or more attributes associated with an asset, and signing a transaction for the asset, are referred to as "root rights" herein. An innovative technical mechanism is needed to protect the unrecoverable nature of root rights by mitigating the likelihood of loss of control without sacrificing decentralization of signature authority. Root rights include one or more functions relating to the creation, issuance, transaction, and authorization of tokenized assets on a distributed ledger. In one embodiment, each of these functions requires signing by a root wallet to authorize the transaction. As previously discussed, the frequent use of the root wallet to sign transactions of the distributed ledger increases the exposure of a wallet to the blockchain. The present invention advantageously provides systems and methods for delegating the functions associated with a root right to prevent frequent use of a root wallet and enable a method for clawing back a delegated right.

Root rights of the present invention are named rights assigned based on values stored as immutable data that can be set on creation of a smart contract or in another manner. As described above, a smart contract may store its creator and consult with this property to authorize functions protected by the creator right. Since root rights cannot be changed, if the wallet associated with this right is compromised, it creates conditions for unrecoverable loss of value. To protect the creating wallet from compromise, the smart contract implements the IDelegableRights interface and smart contract of the present invention as described herein. This interface enables root rights to be delegated such that "throw away" wallets receive and utilize the right to exercise the authority associated with a token. If compromised, these wallets are discarded and/or replaced.

In one embodiment of the present invention, a separate smart contract is dedicated to the protection of root rights. A DelegateRegistry (i.e., a set of data structures stored as a table or other database) allows root rights to be delegated one or more times, creating a "layered" wallet structure for risk management. An example of a basic data structure for the DelegateRegistry is shown below.

| Contract | Right | Parent | Delegate |
|---|---|---|---|
| 0xaabbccdd | Creator | 0x1234 | 0x5678 |

In this data structure, the contract column indicates the smart contract through which the root right is being executed and where the root address is recorded. The right column indicates the right protected by this contract (i.e., the type of rights defined by the party who holds the right). The parent column indicates the address delegating the right, and the delegate column indicates the address to whom this right has been assigned. In the displayed data, the creator right for the contract 0xaabbccdd has been assigned by the root wallet 0x1234 to a delegate 0x5678. In one embodiment, the parent is not a root wallet. In one embodiment, the parent wallet is a delegate wallet.

In one embodiment of the present invention, the Issue function in the IDelegableRights smart contract is protected such that only the creator may execute this function. If the Issue function is called, the smart contract first checks to see if the signer is the creator. If not, the contract checks the DelegateRegistry to see if the creator right for the IDelegableRights contract has been delegated and the signer is a delegate, returning true if the signer is a delegate.

The DelegateRegistry stores delegation records as data structures in a database. This registry is operated by smart contracts that implement the IDelegableRight interface, referred to herein as "executing contracts" or "execution contracts". All delegation records are marked with the smart contract that created the record to prevent smart contracts from affecting rights delegation of other smart contracts. For example, the IDelegableRight interface supports three calls: Delegate (right, wallet); Replace (right, wallet, newWallet); and Subsume (right, wallet).

Referring now to the drawings in general, the illustrations are for the purpose of describing one or more preferred embodiments of the invention and are not intended to limit the invention thereto.

FIG. 1 illustrates the symbology used herein to depict a root right and delegation structure. The delegable right of the root wallet is represented at 102 and the functional wallet is represented at 104. Smart contracts implementing the IDelegableRight interface use the DelegateRegistry database to enable root rights to be delegated one or more times, creating a layered wallet structure for risk management.

To delegate rights, a party holding the right signs an DelegableRight.Delegate function via the executing contract (the specific smart contract that executes specific the function protected by the right). The executing contract verifies that the caller attempting to delegate rights has the rights it is attempting to delegate. In one embodiment, the executing contract verifies that the caller attempting to delegate rights has the right to delegate the rights. The executing contract then calls the DelegateRegistry to delegate the right through recordation in the DelegateRegistry database. For example, using the sample data of the basic data structure table used to delegate the creator rights, the call corresponds to: Delegate ('Creator', 0x5678) where 0x1234 signed the transaction as the creator via the 0xaabbccdd execution contract. The rights delegation in this example is recorded as the table entry data structure below.

DelegateRegistry Entry: Right='Creator'; Parent=0x1234[W]; Delegate=0x5678[W];

Contract=0xaabbccdd[SC]

Through this assignment, the delegate wallet now has the right of the parent in the context of the executing contract. Delegation separates the root wallet from a functional wallet that executes functions. Delegation protects the root wallet from cyber risk associated with use since its delegate is signing transactions on its behalf. The less the root wallet is used, the less vulnerable the wallet is to a cyber-attack. In one embodiment, the strength of the delegation model depends on secure, independent custody of the private key of the delegation wallet, as an attack that effectively compromises both wallets could undermine the impact of the disclosed model. In one embodiment, the strength of the delegation model depends on independent custody of the private key of the root wallet, wherein the delegation wallet is not associated with the private key of the root wallet.

In one embodiment, in the event of compromise of the delegate wallet, the root wallet restores control by replacing the delegate wallet. In one embodiment, in the event of compromise of the delegate wallet, the root wallet regains control by subsuming the delegate wallet. To remove a delegate wallet's right, a party with the right calls the IDelegableRight. Subsume function from the executing contract. For example, to remove the right assigned in the previous example, the function Subsume ('Creator', 0x5678) would be executed, removing this row from the table and preventing 0x5678 from executing this right on behalf of the creator of the executing contract. In one embodiment, in the event of compromise of the delegate wallet, a transfer agent has the right to reverse a transaction and/or recover value for an illicit or mistaken transaction. To accomplish this, the transfer agent removes the value from an illicit wallet and transfers the value back to the root wallet and/or a newly designated wallet.

In one embodiment, multiple layers of delegation are applied to prevent compromise of a root wallet. In one embodiment of the present invention, multiple layers of delegation are applied if delegate replacement happens frequently. Advantageously, in one embodiment, the root right is only utilized twice, once for smart contract creation and a second time to delegate this right to a wallet used to execute the right and/or further delegate the right. The reduced use of the root right mitigates the opportunity for an attacking party to access the root wallet and thereby access the value of the asset in the root wallet. In one embodiment, if meaningful risk of compromise exists for a delegated right (e.g., threshold number of root right uses and/or indication of an impending attack), the rights are delegated a second time. In one embodiment, the rights are delegated a third time. In one embodiment, rights are only delegated a third time if meaningful risk of compromise exists after the second delegation of a delegated right. Delegate recovery involves signing a transaction by a supervisor wallet (i.e., a wallet higher in the delegation chain), which increases the length of the process for accessing the value of the root wallet, thereby increasing the level of security of the value by adding additional delegation layers. To ensure no cyber risk is incurred by the root wallet, the delegation should occur with as many layers as required to ensure the root wallet right is not utilized in restoration, thereby protecting the root wallet from cyber risk.

Figure 2:
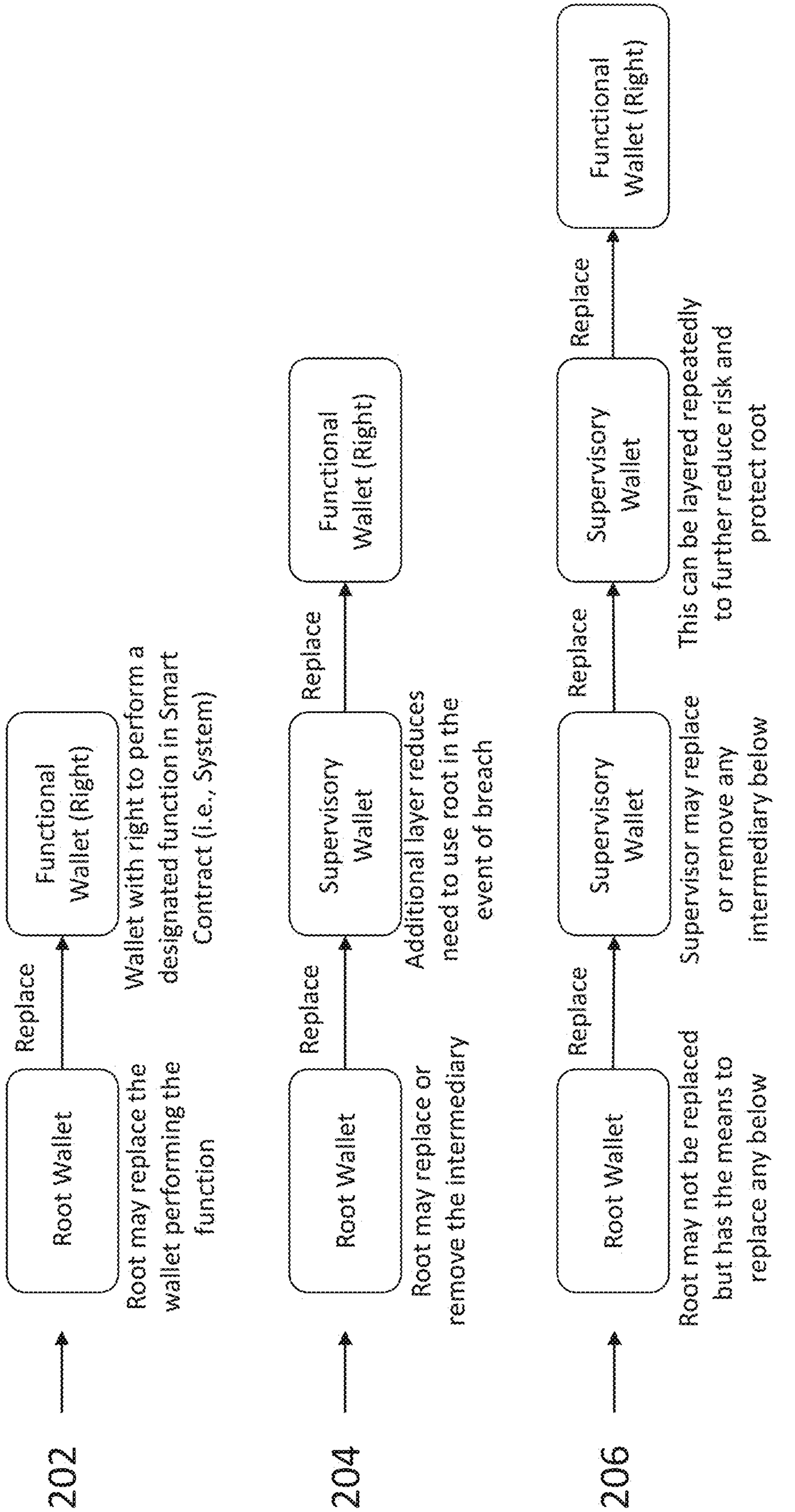
FIG. 2 illustrates a schematic representation of patterns of layered delegation according to one embodiment of the present invention.

FIG. 2 illustrates patterns of layered delegation according to one embodiment of the present invention. At 202, the root wallet has delegated a right to a functional wallet. The root may later replace the functional wallet or subsume (i.e., revoke) the delegation. At 204, the wallet that has received the delegation in 202 further delegates the right, thereby acting as a "supervisor" to another wallet which is used to exercise the functional right. At 206, the supervisory wallet delegates the supervisory role to another wallet, creating an additional layer protecting the root. A wallet is configured to replace any wallet below it in the chain/layer. All actions taken in regard to the delegation process of the present invention are recorded in the DelegateRegistry.

Figure 3:
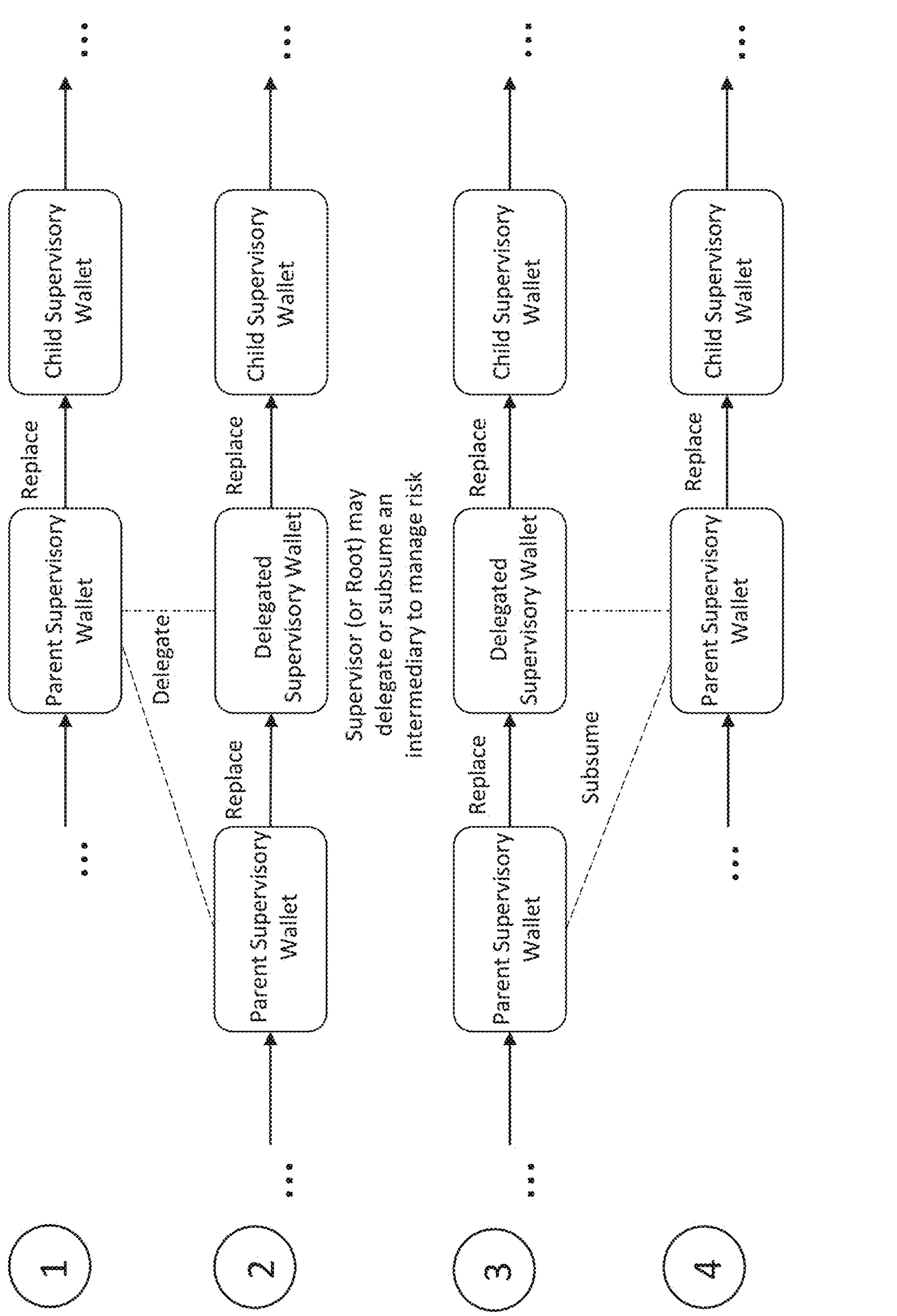
FIG. 3 illustrates a schematic illustration of an example of a sequence of operations based on layered wallet management according to one embodiment of the present invention.

FIG. 3 illustrates an example of a sequence of operations based on layered wallet management according to one embodiment of the present invention. Each row of FIG. 3 represents a state of rights delegation. The data entry of the delegated rights are entered into the DelegateRegistry as the rights are assigned. At 1, a root wallet delegates creator rights for a system attribute to a parent supervisory wallet ("WarmRoot") which results in an entry in the DelegateRegistry of:

Right=Creator; Parent=Root[W]; Delegate=WarmRoot[W]; Contract=AttributeRegistry[SC]

At 2, the parent supervisory wallet delegates creator right to a delegated supervisory wallet ("HotRoot"), resulting in and entry in the DelegateRegistry of:

Right=Creator; Parent=WarmRoot[W]; Delegate=HotRoot[W];

Contract=AttributeRegistry[SC]

At 3, a root replace operation is called to replace the parent supervisory wallet with the delegated supervisory wallet resulting in an entry in the DelegateRegistry:

Right=Creator; Parent=Root[W]; Delegate=HotRoot[W]; Contract=AttributeRegistry[SC]

DelegateRegistry Auto-Update: Right=Creator; Parent=HotRoot[W];

Delegate=WarmRoot[W]; Contract=AttributeRegistry[SC]

At 4, the right is subsumed by parent supervisory wallet:

DelegateRegistry Remove: Right=Creator; Parent=Root[W]; Delegate=HotRoot[W];

Contract=AttributeRegistry[SC]

Delegate Registry Auto-Update: Right=Creator; Parent=Root[W]; Delegate=WarmRoot[W];

Contract=AttributeRegistry[SC]

In the present invention, hierarchical wallet management is used to manage the cyber risk posed to root rights. This mechanism is leveraged for confederated rights management, in the manner described herein, wherein complex rights representing the interests of many parties are built from base rights that are protected from loss or compromise.

A financial ecosystem depends on many interactions between independent corporate entities, coalitions of entities, and individuals. In a global financial ecosystem, the central control of authority is not possible due to the variety of independent actors and regulatory regimes. However, parties within a financial ecosystem band together into corporations, groups, or other shared enterprises. These parties may further coalesce into confederations, (i.e., loose coalitions without a central authority) to engage in commerce. To scale the exchange of trusted information in a confederation, participants will designate mutual communication methods, common data formats, and rights for participants.

Effective commerce requires a framework that allows entities to define and manage permissions and combine, share, or enforce these rights at scale. A system designed to support the range of entity types and variety of transactions encountered in global commerce must be flexible, expressive, reversible, decentralized, and secure such that there is no unauthorized escalation of rights. Decentralized authority, a core benefit of blockchain, provides a baseline on which a decentralized permission framework for global commerce is composed.

The present invention provides a confederated authority framework having a data model that is self-describing, in which rights (expressed as attributes), and the right to define other*, are self-describing emerge in a curated manner from an initial exercise of authority. This framework extends the rights to the creation of policies (i.e., expressions of multiple rights that govern actions including the right to create and manage rights and policies). From there, contracts (i.e., code or other agreements) are deployed and managed with the desired rights and certifications to enable and automate various transactions with requisite levels of security. Finally, the actions are linked to units of value (e.g., tokens) created and managed under the rights framework of the present invention. Transactions in tokens are governed by the rights, policies, and contracts that are created within the decentralized framework. The present invention includes a method for establishing a self-describing permission framework to enable confederated authority and the governance of a complex ecosystem starting from a single authority.

In one embodiment of the present invention, the data model for confederated management of rights includes three tables and/or databases: ContextRegistry, AttributeRegistry, and AttestationRegistry. A context defines a scope of control for one or more attributes. In one embodiment of the present invention, when a context is created, the creator holds all rights to update the context and create and manage attributes and attestations within the context. These rights are configured to be assigned to other parties using attestations or other methods derived from attributes (i.e., policies and/or contracts), as described below.

An example of code for implementing the ContextRegistry is included in the appendix to the specification, incorporated herein by reference on its entirety. An example data structure of a ContextRegistry record is shown below.

| Id | Name | Creator | SelfSovereign | ParentId |
|---|---|---|---|---|
| 0xabcd | Core | 0x1234 | false | [Null] |

In this data structure, the identification (i.e., Id) column indicates a unique identifier for a context. The name column indicates a descriptive name for a context. The creator column indicates the wallet address associated with the wallet that created the context. The self sovereign column indicates the Boolean return for a smart contract (i.e., SelfSovereign) used to determine the self-sovereignty of the context. If false, the context cannot be overridden by the system right. If true, the context can be overridden by the system right. The ParentId column identifies the context from which the context inherits control.

An example code for implementing the AttributeRegistry according to one embodiment off the present invention is included in the appendix to the specification, incorporated herein by reference in its entirety. An example data structure for a record in the AttributeRegistry is set forth below.

| Id | Name | ContextId | DataType | ParentId | SourceId |
|---|---|---|---|---|---|
| 0xa1b1 | System | 0xabcd (Core) | Boolean | [Null] | [Internal] |

In this data structure, the identification (i.e., Id) column indicates a unique identifier for an attribute. The name column indicates a descriptive name for an attribute. The context identification column indicates the context in which the attribute is accessed and managed. The DataType column indicates the Boolean return for a smart contract used to determine the data type for values assigned to the Attribute in the AttestationRegistry or other sources. An enumeration of DataType values is included in the appendix to the specification. In one embodiment, the ParentId column identifies the attribute Id from which the attribute inherits one or more policies and/or contracts. The SourceId column indicates the location of data used for attestations involving the attribute. In one embodiment, the source is external, one or more third party oracles, smart contracts, and/or other external data sources. In one embodiment, the computer program of the present invention assumes the source is an internal data store (i.e., the AttestationRegistry with read and write rules controlled by the context).

An example code for implementing the AttestationRegistry according to one embodiment of the present invention is included in the PropertyMetadata portion of the appendix to the specification, incorporated herein by reference in its entirety. An example data structure of a record in the AttestationRegistry is set forth below.

| Id | AttributeId | Key | Value | Creator | Expiration |
|---|---|---|---|---|---|
| 0x12ef | 0xa1b1 (System) | 0x5678 (in this case a wallet) | true | 0x1234 | [Null] |

In this data structure, the identification (i.e., Id) column indicates a unique identifier for an attestation. The AttributeId column indicates the attribute defining the format and purpose of the attestation. The key column indicates the item to which the value is assigned (i.e., the wallet address and/or the public key associated with a wallet address). In one embodiment, the key is a composite key linking more than one item to the value. The value column indicates the Boolean return for smart contract deployed to determine if a value is assigned for the attestation. The creator column identifies the party who set the attestation value (i.e., the wallet address of the party who set the attestation value). The expiration column indicates the time when an attestation expires.

Using these data structures, a context creator creates attributes representing roles, as described in greater detail herein. The roles are assigned to wallets via an attestation. The creator assigns the roles (i.e., attributes to specific functions used to manage contexts, attributes, and attestations) thereby creating a management structure that manages the management structure, that is, a self-describing, self-managing system that is used to allow groups to form and manage rights collaboratively. In one embodiment, a wallet is able to include one or more attributes representing core roles. In one embodiment of the present invention, fewer than all roles and rights disclosed herein are included in the platform. In one embodiment of the present invention, some or all of the functionality of a disclosed role is attributed to one or more other roles of the present invention.

To establish the self-describing rights framework, a root authority (i.e., a party entrusted to create and operate key elements of the system) deploys a smart contract infrastructure including the ContextRegistry, AttributeRegistry, and AttestationRegistry to instantiate the framework. One of ordinary skill in the art will appreciate the structure and process of deploying of smart contracts to distributed ledgers. In one embodiment of the present invention, the root authority is only enacted at system initiation. In one embodiment of the present invention, the root authority is only enacted at system initiation unless there is an extraordinary event that requires a reset of basic rights. If a context is created with the SelfSovereign value set to true, the root need not be trusted by the creating confederation since the root (or assigned system right) will not have the right to modify the context.

After smart contract deployment, the first act of the root is to sign a transaction to create the core context in the ContextRegistry. One of ordinary skill in the art will appreciate the transaction structure required to set data in the designated format within a registry. The specific function signatures may vary. The root then signs a transaction to create a system attribute (i.e., the role) in the core context. The root then signs a transaction to create a record in the AttestationRegistry that assigns the value with a key to the system attribute, thereby assigning the wallet with the address corresponding to the key to the system role.

In one embodiment of the present invention, the root then signs a transaction to create another system attribute (i.e., the curator role) in the core context. The root then signs a transaction to create another record in the AttestationRegistry that assigns the value with a key to the system attribute, thereby assigning the wallet with the address corresponding to the key to the system curator role. In this way, the system account assigns core authorizers to act as curators to ensure that only known and qualified entities perform actions in the system. By allowing only a wallet containing the designated right within a context to modify the context, the present invention advantageously prevents rights escalation and cross entity authorization (i.e., an unaffiliated entity assigning rights for another entity).

Figure 4:
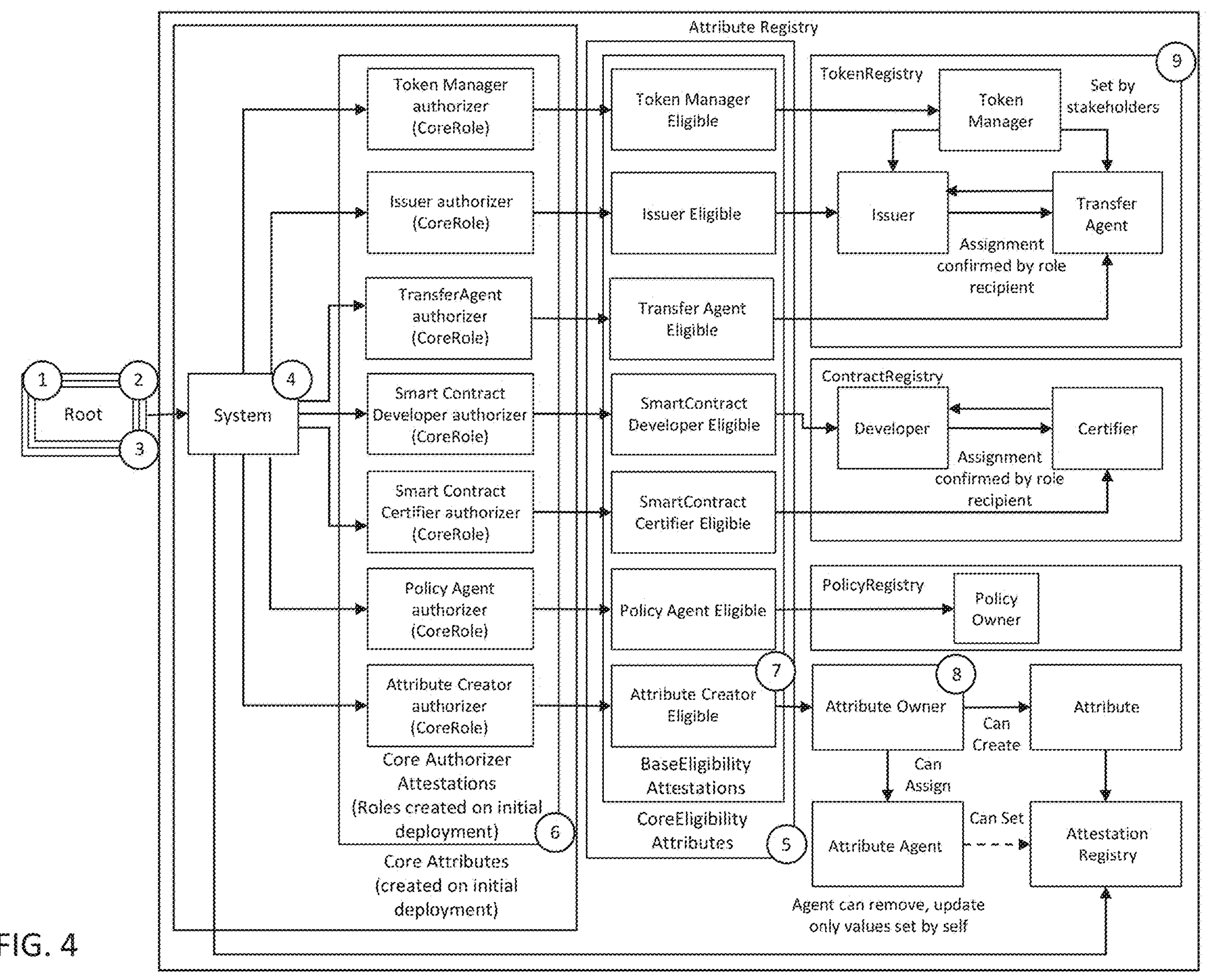
FIG. 4 illustrates a schematic illustration of the smart contract architecture for a full implementation of a confederated rights management system according to one embodiment of the present invention.

FIG. 4 illustrates the smart contract architecture for a full implementation of a confederated rights management system according to one embodiment of the present invention. The architecture consists of a root right assigned to a party that deploys the framework. The architecture further includes a series of registries used to create and manage rights derived from the root right. The AttributeRegistry allows the creation and management of any role or right, including rights that are used to govern the infrastructure. The following describes a process for configuration of the infrastructure to enable confederated rights management. For each step of the setup process, Attributes are recorded in the registries as disclosed herein using the code listed in the appendix. Initially, wallets which will be used to exercise root, warm root, and system functions exist with separate key management at 1. At 2, the root deploys the infrastructure smart contracts and is recorded as the creator. An exemplary code for the smart contracts for initiating the infrastructure is included in the appendix to the specification. At 3, the root delegates to the warm root thereby assigning ecosystem creator right and responsibilities as described in the delegation flows herein. In one embodiment, ecosystem creator rights and responsibilities are removeable by the root. In one embodiment, ecosystem creator rights and responsibilities are removeable by the root and/or another role (e.g., administrator).

At 4, the root creates a system attribute and assigns attestation for wallet performing the system role. The data entries in the ContextRegistry, AttributeRegistry, and AttestationRegistry for this step are shown in the tables and example herein. At 5, the system creates core eligibility attributes. The data entries for this step follow the same pattern established in the previous step, wherein the root creates a system attribute and assigns attestation for wallet performing the system role. The eligibility attributes of the present invention include but are not limited to a token manager eligibility attribute, an issuer eligibility attribute, a transfer agent eligibility attribute, a smart contract developer eligibility attribute, a smart contract certifier eligibility attribute, a policy agent eligibility attribute, and an attribute creator eligibility attribute. Subsequently, at 6, the system creates core authorizer attributes and makes attestations for each wallet performing role. The roles of the present invention include but are not limited to a token manager role (i.e., a manager), an issuer role, a transfer agent role, a smart contract developer role, a smart contract certifier role, a policy agent role, and an attribute creator role.

At 7, authorizers assign respective core eligibility attribute rights to desired wallets for each attribute. For example, the Token Manager core eligibility attribute is created as an attestation. The Token Manager authorizer role is a core attribute assigned to a wallet as a core attestation upon initial deployment of the infrastructure smart contracts. Upon creating the Token Manager authorizer role, the Token Manager core eligibility attribute is assigned to the role. At 8, eligible attribute creators create new attributes which govern other roles as desired. At 9, eligible creators may create self-sovereign tokens, asset, contracts, and policies and may further assign rights for these entities.

Eligibility attributes enable an authorizer role to perform the role associated with the wallet. Eligibility attributes attest to the eligibility of the wallet performing the role, thereby enabling the wallet to execute the necessary functions associated with the role. Wallets including an eligibility attribute are considered by the system of the present invention to be eligible to perform the functions associated with a core role (e.g., a transfer agent).

One of the basic actions is the ability to create an attribute (e.g., a right). In one embodiment, authorized rights creators create and manage a right. This enables any authorized entity to create and manage its own ecosystem. This framework enables interactions between entities and collective action between unaffiliated entities. A shorthand notation is used to show the data structures that will be created as part of the setup sequence.

Figure 5:
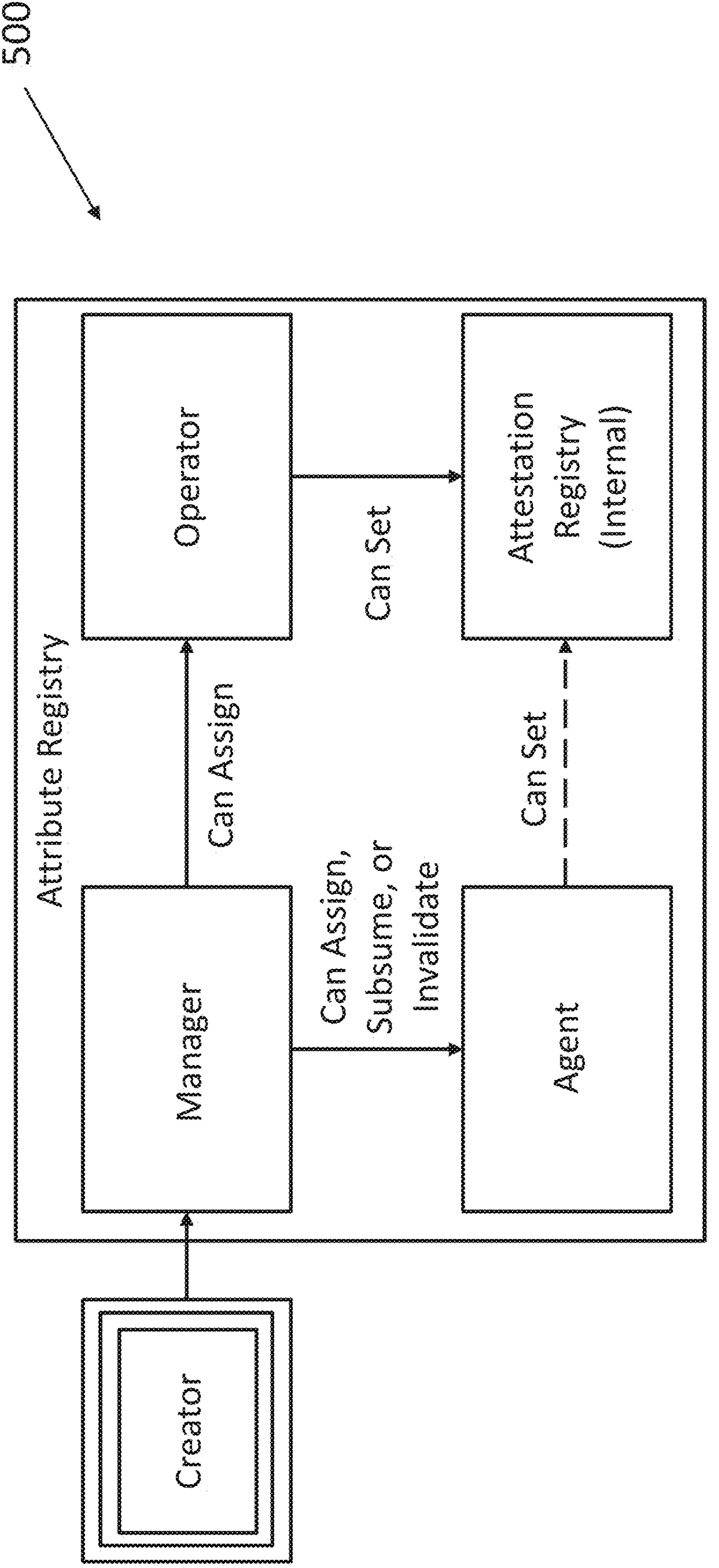
FIG. 5 illustrates a schematic illustration of an example of a rights object according to one embodiment of the present invention.

FIG. 5 illustrates an example of a rights object 500 according to one embodiment of the present invention. A creator creates a context through an entry in the ContextRegistry. On one embodiment, the ContextRegistry has a default policy that a creator must have the AttributeRoleEligible creator attestation (i.e., the role). To validate the core attribute attestation, the following record is recorded in the AttributeRegistry.

Attribute=AttributeRoleEligible; Key=Creator[W]; Value=Creator;
Source=AttributeRoleAuthorizer[W]; Contract=ContextRegistry[SC]

The context creator is recorded with the context entry in the ContextRegistry. In one embodiment, this role is delegated as described herein. In one embodiment, the manager role is self-assigned by the creator upon attribute creation. In one embodiment, only one manager role is operable to be assigned for an attribute. The following record is recorded in the AttributeRegistry.

Attribute=AttributeRole; Key=Attribute[ID], Creator [W]; Value=Manager;

Source=Creator[W]; Contract=AttributeRegistry

Upon the creation of a context, the manager role is self-assigned by the creator through the following data structure.

Attribute=ContextRole; Key=Context[ID], Creator[W]; Value=Manager;

Source=Creator[W]; Contract=AttributeRegistry

In one embodiment, a context manager creates one or more attributes within the context. Upon creation of an attribute, the operator role is self-assigned by its creator, the context manager, and the following record is recorded in the AttributeRegistry.

Attribute=Attribute; Key=Context[ID], Creator[W]; Value=Operator; Source=Creator[W];

Contract=AttributeRegistry

The ContextRegistry Creator may assign a policy which enforces one or more rules. In one embodiment, one rule enforced by the policy allows only one manager for a context. If the manager role has been set by the creator, the creator is operable to reassign the manager. If the manager role has been set by the delegator, the delegator is operable to reassign the manager. In one embodiment, one rule enforced by the policy allows the manger role to be set by the system if the context is not self-sovereign. In one embodiment, the default context is self-sovereign. In one embodiment, the default context is not self-sovereign. In one embodiment, the default policy allows the manger role to be set by the system if the context is not self-sovereign. In one embodiment, the manager adds or removes AttributeRoles (e.g., operator, agent).

The manager may add or remove operators for attributes by recording the following record in the AtributeRegistry.

Attribute=AttributeRole; Key=Attribute[ID], Operator [W]; Value=Operator;

Source=Manager[W]; Contract=AttributeRegistry

The manager may add or remove agents for the attribute by recording the following record in the AttributeRegistry.

Attribute=AttributeRole; Key=Attribute[ID], Agent[W]; Value=Agent;

Source=Manager[W]; Contract=AttributeRegistry

In one embodiment, a default policy is assigned at AttestationRegistry setup. In one embodiment, the AttestationRegistry includes a default policy that allows attribute operators to add, update, or remove any attestation for the attribute. In one embodiment, the attribute agents are only able to update or remove attributes for which they are the source. In one embodiment, the attribute agents and/or operators are able to set attestations for an attribute. In one embodiment of the present invention, attestations are listed as values in the AttributeRegistry. In one embodiment of the present invention, one or more attributes use an internal store for values called the AttestationRegistry. Other attributes point to external data from various sources. One type of attribute is one that permits self-attestation, that is, an attribute whose value is set by an affected party, specified as set for the below for example.

*[W]=Wallet address, [SC]=Smart Contract address, [ID] =Attribute Identifier

In a similar manner, other actions create basic objects in the system (e.g., policies, contracts, entities, units of value) that are used to encode participants and any other aspect of financial transactions. Policies are combinations of rules, the rules being statements that evaluate one or more attributes against other data, the rules used to govern smart contact transactions. The structure and function of the rules, policies, and the policy engine for processing such policies are described in U.S. application Ser. No. 16/143,058, which is incorporated herein by reference. Policies are derived from attributes. In one embodiment, policies are used to compose attributes into rules. In one embodiment, rules are applied to the creation and management of contexts, attributes, and attestations. This is yet another way that the disclosed data structure is used to govern itself and allows for the creation of a management structure to align a confederation.

Figure 6:
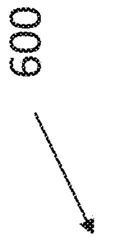
FIG. 6 illustrates a schematic illustration of a policy object according to one embodiment of the present invention.
Figure 6:
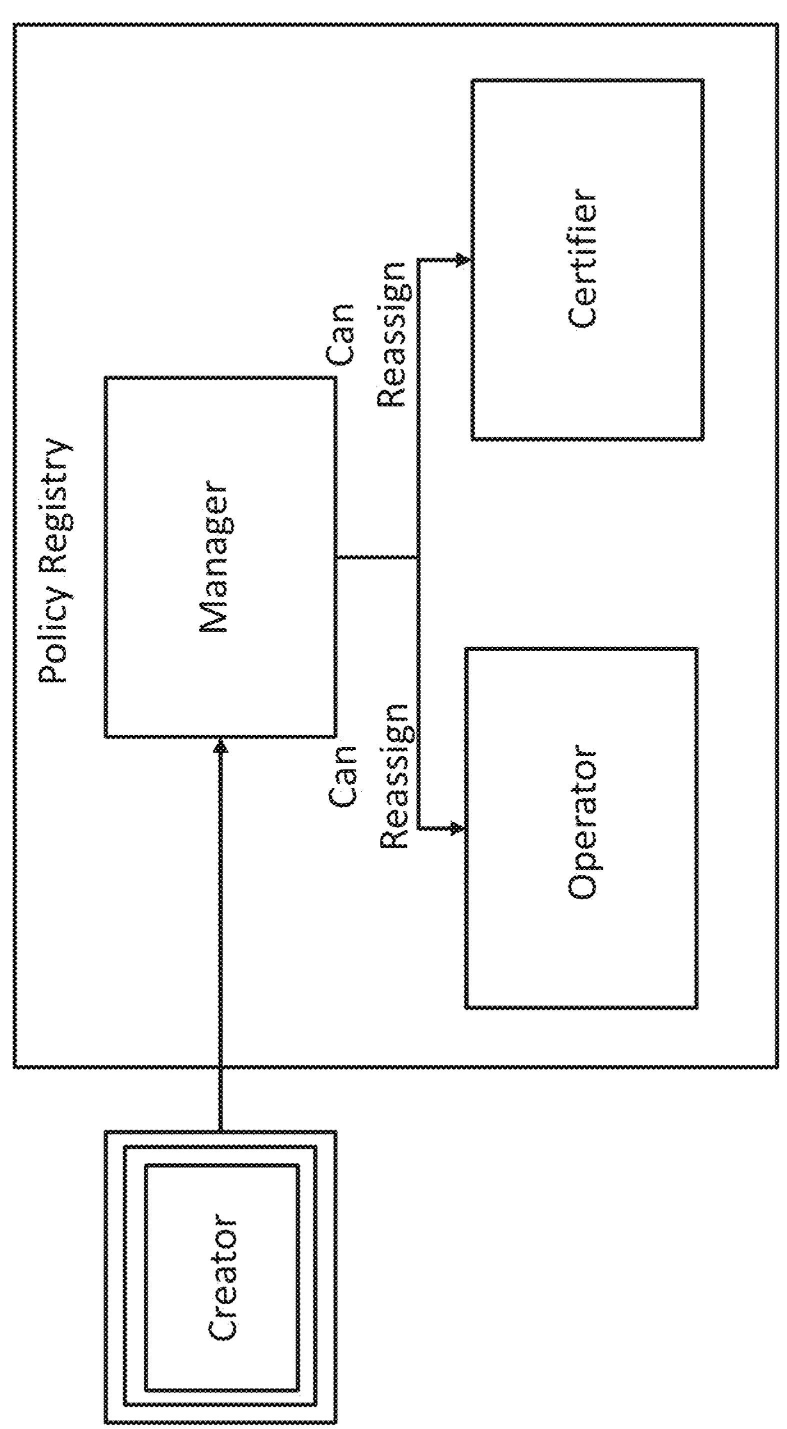

FIG. 6 illustrates a policy object 600 created by the creator. In one embodiment, a default policy is assigned at PolicyRegistry setup. In one embodiment, the PolicyRegistry includes a default policy that requires the creator to have the PolicyRoleEligible creator attestation (i.e., the creator role), expressed in the following manner for example.

Attribute=PolicyRoleEligible; Key=Creator[W]; Value=Creator;

Source=PolicyRoleAuthorizer[W]; Contract=AttributeRegistry[SC]

In one embodiment, the creator is recorded with the policy entry in the AttributeRegistry. In one embodiment, this role is delegated. Upon creation of a policy object, the manager role is self-assigned by the creator through the following record.

Attribute=PolicyRole; Key=Policy[ID], Creator[W]; Value=Manager; Source=Creator[W];

Contract=PolicyRegistry[SC]

In one embodiment, the PolicyRegistry has a policy which enforces one or more rules for the policy engine. In one embodiment, a rule of the policy allows only one manager for a policy. In one embodiment, a rule of the policy allows the creator to reassign the manager if the manager role has been set by the creator. In one embodiment, a rule of the policy allows the delegate to reassign the manager if the manager role has been set by the delegate. In one embodiment, a rule of the policy allows the system to set the manager if the policy is not self-sovereign. In one embodiment, the default policy is self-sovereign. In one embodiment, the default policy is not self-sovereign. In one embodiment, a rule of the policy allows the manager to add and/or remove PolicyRoles (e.g., an operator and/or certifier). In one embodiment, the default policy is not self-sovereign. In one embodiment, the policy is assigned upon creation. In one embodiment, the policy is assigned after creation.

Upon creation of a policy object, the operator and certifier roles are self-assigned by the creator through the following records.

Attribute=PolicyRole; Key=Policy[ID], Creator[W]; Value=Operator; Source=Creator[W];

Contract=PolicyRegistry[SC];

Attribute=PolicyRole; Key=Policy[ID], Certifier[W]; Value=Certifier; Source=Creator[W];

Contract=PolicyRegistry[SC];

In one embodiment, the manager assigns one or more parties as operator, at 3, by recording the following.

Attribute=PolicyRole; Key=Policy[ID], Operator[W]; Value=Operator;

Source=Manager[W]; Contract=PolicyRegistry[SC];

In one embodiment, there is only one certifier for a policy. In one embodiment, if the certifier is any party other than the creator, the certifier must have the PolicyRoleEligible Certifier Attestation (i.e., the certifier role). The certifier must acknowledge assignment before the role is applied. The following data structures specify this.

Attribute=PolicyRoleEligible; Key=Certifier[W]; Value=Certifier;

Source=PolicyRoleAuthorizer[W]; Contract=AttributeRegistry[SC]

Attribute=PolicyRole; Key=Policy[ID], Certifier[W]; Value=Certifier; Source=Manager[W];

Contract=PolicyRegistry[SC];

*[W]=Wallet address, [SC]=Smart Contract address, [ID] =Registry identifier

As described herein, smart contracts are used to execute logic on distributed ledgers. In one embodiment, the new smart contracts are deployed to change the behavior of configured systems including the rights management system disclosed herein. In one embodiment, the rights management system is used to govern permissions to conduct upgrades on the rights management system as described herein.

Figure 7:
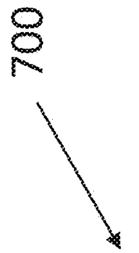
FIG. 7 illustrates a schematic illustration of a smart contract object according to one embodiment of the present invention.
Figure 7:
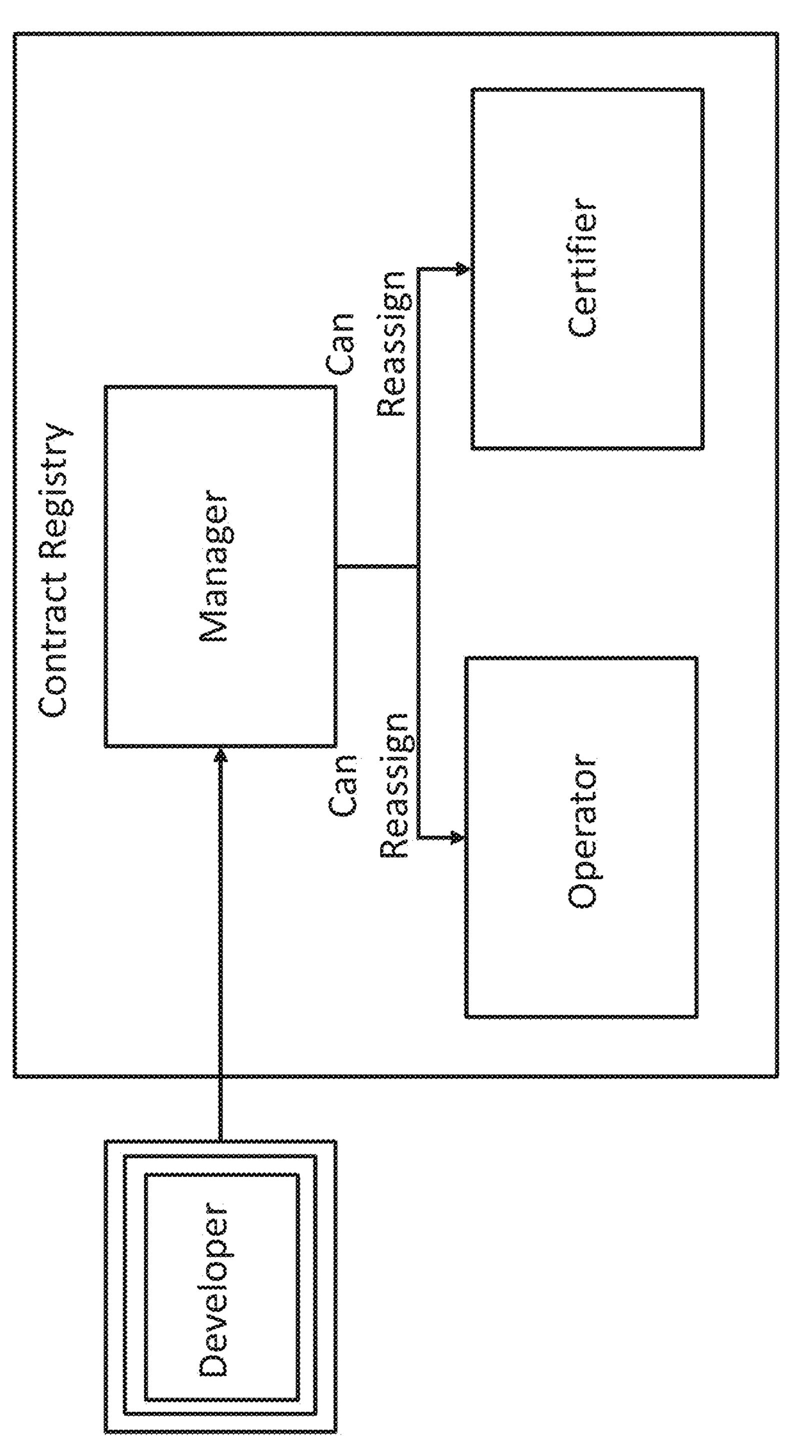

FIG. 7 illustrates the creation of a smart contract object according to one embodiment of the present invention. A developer (i.e., a party assigned the Smart Contract Developer Core Attribute Attestation) may create a SmartContract object 700. In one embodiment, a default policy is assigned at ContractRegistry setup. In one embodiment, the ContractRegistry includes a default policy that that requires the developer to have the ContractRoleEligible Developer Attestation (i.e., the developer role) specified by the data structure herein.

Attribute=ContractRoleEligible; Key=Developer[W]; Value=Developer;

Source=ContractRoleAuthorizer[W]; Contract=AttributeRegistry[SC]

The Developer is recorded with the Contract entry in the Registry. This role can be Delegated. On Contract object creation, the Manager role is self-assigned by the Developer through the following data structure.

Attribute=ContractRole; Key=TokenID[SC], Developer [W]; Value=Manager;

Source=Developer[W]; Contract=ContractRegistry[SC]

In one embodiment, the ContractRegistry includes a policy which enforces one or more rules. In one embodiment, a rule of the policy allows only one manager for a contract. In one embodiment, a rule of the policy allows the developer to reassign the manager if the manager role has been set by the developer. In one embodiment, a rule of the policy allows the delegate to reassign the manager if the manager role has been set by the delegate. In one embodiment, a rule of the policy allows the system to set the manager if the contract is not self-sovereign. In one embodiment, the default contract is self-sovereign. In one embodiment, the default contract is not self-sovereign. In one embodiment, a rule of the policy allows the manager to add and/or remove ContractRoles (e.g., an operator and/or certifier). In one embodiment, the policy is assigned upon creation of the ContractRegistry. In one embodiment, the policy is assigned after creation of the ContractRegistry.

Upon creation of a contract object, the operator and certifier roles are self-assigned by the developer through the following data structures.

Attribute=ContractRole; Key=ContractID[SC], Developer[W]; Value=Operator;

Source=Developer[W]; Contract=ContractRegistry[SC]

Attribute=ContractRole; Key=ContractID[SC], Certifier [W]; Value=Certifier;

Source=Developer[W]; Contract=ContractRegistry[SC];

In one embodiment, the manager assigns one or more parties as an operator using the following data structure.

Attribute=ContractRole; Key=ContractID[SC], Operator [W]; Value=Operator;

Source=Manager[W]; Contract=ContractRegistry[SC];

In one embodiment of the present invention, a creator deploys a policy which restricts the attribute management system to only one certifier for a contract. If the certifier is any party other than the developer, the certifier must have the ContractRoleEligible Certifier Attestation (i.e., the certifier role). The certifier must acknowledge assignment before the role is applied.

Attribute=ContractRoleEligible; Key=Certifier[W]; Value=Certifier;

Source=ContractRoleAuthorizer[W]; Contract=AttributeRegistry[SC]

Attestation=>Attribute=ContractRole; Key=ContractID [SC], Certifier[W]; Value=Certifier;

Source=Manager[W]; Contract=ContractRegistry[SC];

*[W]=Wallet address, [SC]=Smart Contract address

Token Registry

Figure 8:
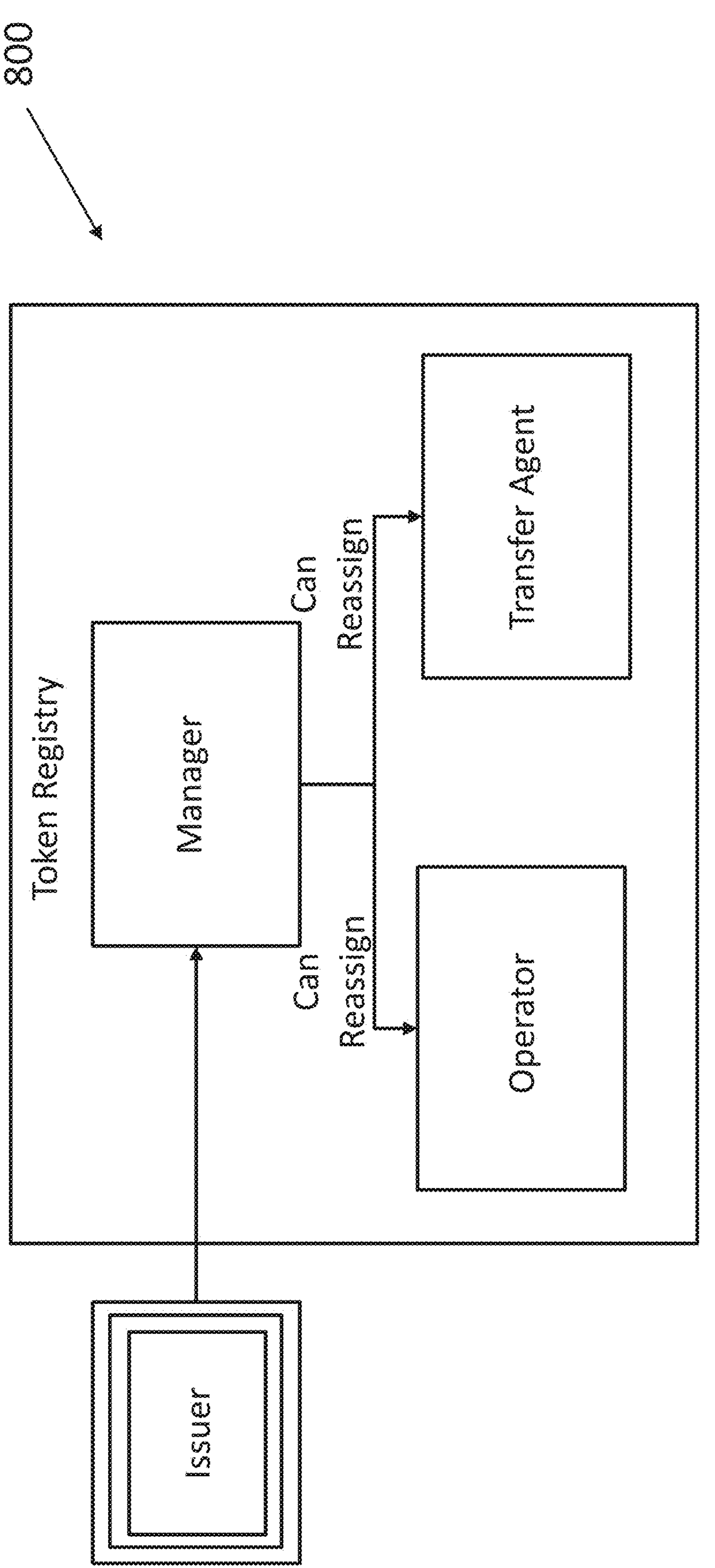
FIG. 8 illustrates a schematic illustration of a token object according to one embodiment of the present invention.

FIG. 8 is a schematic illustration of a token object according to one embodiment of the present invention. An issuer (i.e., an issuer role Core Attribute Attestation) creates a token through a smart contract 800 defining ownership and/or rights in the token. In one embodiment, a default policy is assigned at TokenRegistry setup. In one embodiment, the TokenRegistry includes a default policy that requires the issuer to have the TokenRoleEligible issuer attestation (i.e., the issuer role) specified through the following data structure.

Validate Attestation=>Attribute=TokenRoleEligible; Key=Issuer[W]; Value=Issuer;

Source=TokenRoleAuthorizer[W]; Contract=AttributeRegistry[SC]

The issuer is recorded with the token entry in the registry. In one embodiment, this role is delegable. Upon creation of a token, the manager role is self-assigned by the issuer through the following data structure.

Attribute=TokenRole; Key=TokenID[SC], Issuer[W]; Value=Manager; Source=Issuer[W];

Contract=TokenRegistry[SC]

In one embodiment, the TokenRegistry includes a policy which enforces one or more rules. In one embodiment, a rule of the policy allows only one manager for a token. In one embodiment, a rule of the policy allows the issuer to reassign the manager if the manager role has been set by the issuer. In one embodiment, a rule of the policy allows the system to set the manager if the token is not self-sovereign. In one embodiment, the default token is self-sovereign. In one embodiment, the default token is not self-sovereign. In one embodiment, a rule of the policy allows the manager to be set by an election from one or more tokenholders. The process for the election held by one or more tokenholders is disclosed in U.S. application Ser. No. 17/332,375, incorporated herein by reference in its entirety. In one embodiment, a rule of the policy allows the manager to add and/or remove TokenRoles (e.g., an operator and/or a transfer agent). In one embodiment, the policy is assigned upon creation of the TokenRegistry. In one embodiment, the policy is assigned after creation of the TokenRegistry.

Upon creation of a token, the operator and agent roles are self-assigned by the issuer through the following data structures.

Attribute=TokenRole; Key=TokenID[SC], Issuer[W]; Value=Operator; Source=Issuer[W];

Contract=TokenRegistry[SC];

Attribute=TokenRole; Key=TokenID[SC], Issuer[W]; Value=Agent; Source=Issuer[W];

Contract=TokenRegistry[SC];

In one embodiment, the manager assigns one or more parties as operators through the following data structure.

Attribute=TokenRole; Key=TokenID[SC], Operator[W]; Value=Operator;

Source=Manager[W]; Contract=TokenRegistry[SC];

In one embodiment, there is only one transfer agent allowed for a token. In one embodiment, multiple parties are assigned transfer agent status for a token. If the agent is any party other than the issuer, the agent must have the TokenRoleEligible Agent Attestation (i.e., the token agent role). The agent must acknowledge assignment before the role is applied through the following data structures.

Attribute=TokenRoleEligible; Key=Agent[W]; Value=Agent;

Source=TokenRoleAuthorizer[W]; Contract=AttributeRegistry[SC]

Attribute=TokenRole; Key=TokenID[SC], Agent[W]; Value=Agent; Source=Manager[W];

Contract=TokenRegistry[SC];

*[W]=Wallet address, [SC]=Smart Contract address

Figure 9:
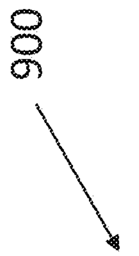
FIG. 9 illustrates a schematic illustration of an asset object according to one embodiment of the present invention.
Figure 9:
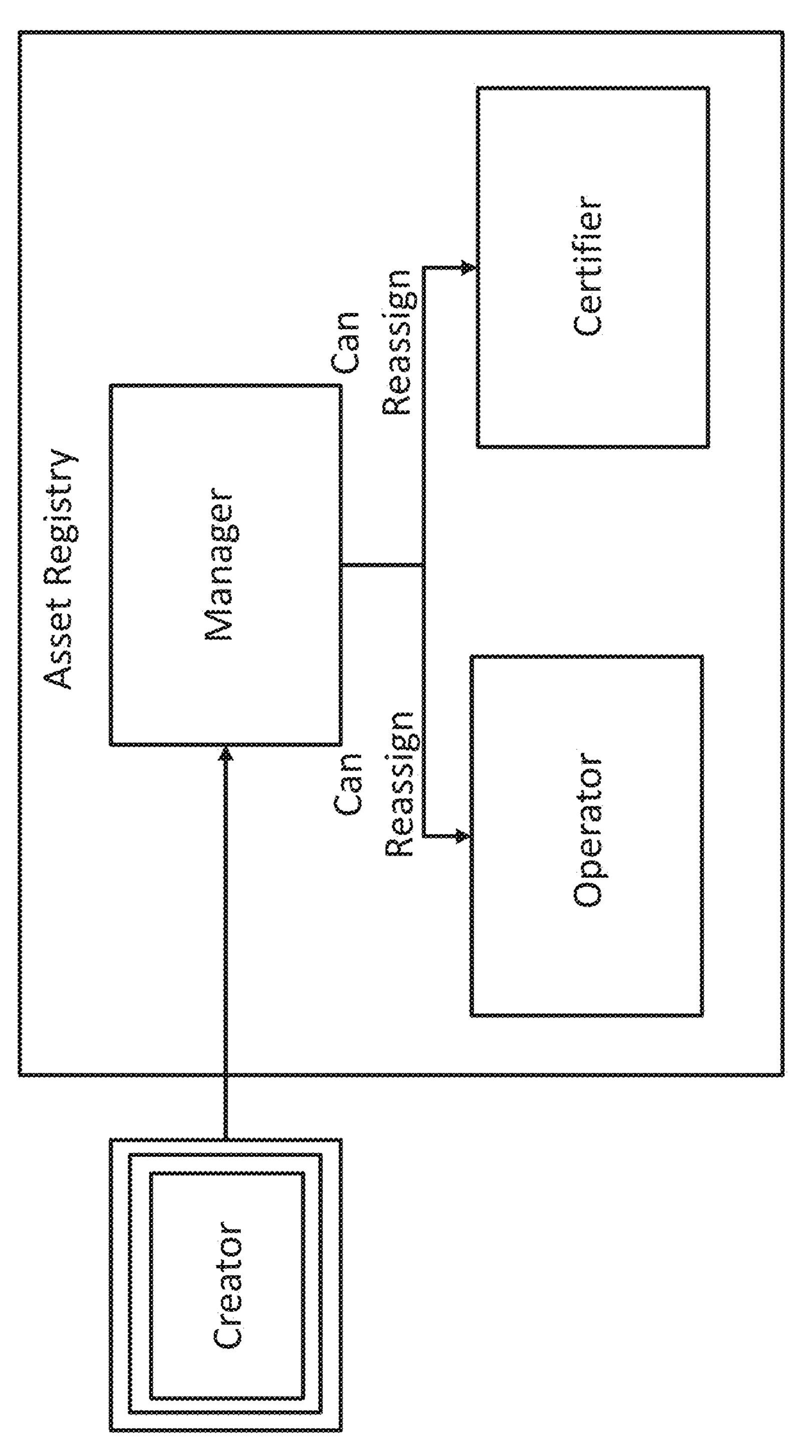

FIG. 9 is a schematic illustration of an asset object according to one embodiment of the present invention. An asset creator (i.e., a creator core attribute attestation) creates an asset object 900. In one embodiment, a default policy is assigned at AssetRegistry setup. In one embodiment, a default policy is assigned after AssetRegistry setup. In one embodiment, the AssetRegistry includes a default policy that that requires the creator to have the AssetRoleEligible Creator Attestation (i.e., creator role) as expressed below.

Attribute=AssetRoleEligible; Key=Creator[W]; Value=Creator;

Source=AssetRoleAuthorizer[W]; Contract=AttributeRegistry[SC]

In one embodiment, the creator is recorded with the Asset entry in the AssetRegistry. In one embodiment, this role is delegable. Upon creation of the asset, the manager role is self-assigned by the creator through the following data structure.

Attribute=AssetRole; Key=Asset[ID], Creator[W]; Value=Manager; Source=Creator[W];

Contract=AssetRegistry[SC]

The AssetRegistry has a Policy (assigned at or after creation) which enforces the rules below: In one embodiment, the AssetRegistry includes a policy which enforces one or more rules. In one embodiment, a rule of the policy allows only one manager for an asset. In one embodiment, a rule of the policy allows the creator to reassign the manager if the manager role has been set by the creator. In one embodiment, a rule of the policy allows the system to set the manager if the asset is not self-sovereign. In one embodiment, the default asset is self-sovereign. In one embodiment, the default asset is not self-sovereign. In one embodiment, a rule of the policy allows the manager to add or remove AssetRoles (e.g., operator, certifier).

On asset creation, the operator and certifier roles are self-assigned by the creator as follows.

Attestation=>Attribute=AssetRole; Key=Asset[ID], Creator[W]; Value=Operator;

Source=Creator[W]; Contract=AssetRegistry[SC];

Attestation=>Attribute=AssetRole; Key=Asset[ID], Certifier[W]; Value=Certifier;

Source=Creator[W]; Contract=AssetRegistry[SC];

In one embodiment, the manager assigns one or more parties as operator through the data structure below.

Attribute=AssetRole; Key=Asset[ID], Operator[W]; Value=Operator; Source=Manager[W];

Contract=AssetRegistry[SC];

In one embodiment, a creator deploys a policy which restricts the attribute management system such that there may only be one certifier for a contract. In one embodiment, if the certifier is any party other than the developer, the certifier must have the ContractRoleEligible Certifier Attestation (i.e., the contract certifier role). In one embodiment, the certifier must acknowledge assignment before the role is applied.

Attribute=AssetRoleEligible; Key=Certifier[W]; Value=Certifier;

Source=AssetRoleAuthorizer[W]; Contract=AttributeRegistry[SC]

Attribute=AssetRole; Key=Asset[ID], Certifier[W]; Value=Certifier; Source=Manager[W];

Contract=AssetRegistry[SC];

*[W]=Wallet address, [SC]=Smart Contract address, [ID] =Registry identifier

The framework of the disclosed implementations permits a decentralized policy to regulate the decision of the transfer agent right for a particular token, ensuring for stakeholders that the party given the transfer agent right is qualified (i.e., has a legal right and is fully aware of responsibilities) and trustworthy. In one embodiment, the decentralized policy is self-forming. In one embodiment, an attribute is created and managed by the ecosystem stakeholders. In one embodiment, the ecosystem stakeholders managing the attribute assign core authorizers who certify parties to perform key functions such as token issuer or transfer agent. In one embodiment, stakeholders for a particular token assign and/or reassign the transfer agent right to parties who have been certified to hold the transfer agent role.

The complexity of the framework of the present invention may be overwhelming to a participant looking to understand their own rights and the rights of parties who affect the value that they own. If rights are not transparent and accessible, a user may inadvertently participate in transactions where their rights are affected in ways they did not anticipate or understand. Thus, the present invention advantageously includes rights bundled into packages referred to herein as strategies. Strategies provide common investment patterns, associated rights transfer processes, role and rights delegations, This provides participants with a simple model to find an appropriate strategy even if they do not understand the overall process of the right transfer and associated functions included in the strategy. In one embodiment, strategies are self-sovereign. In one embodiment, strategies are managed by a manager.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be its most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 10:
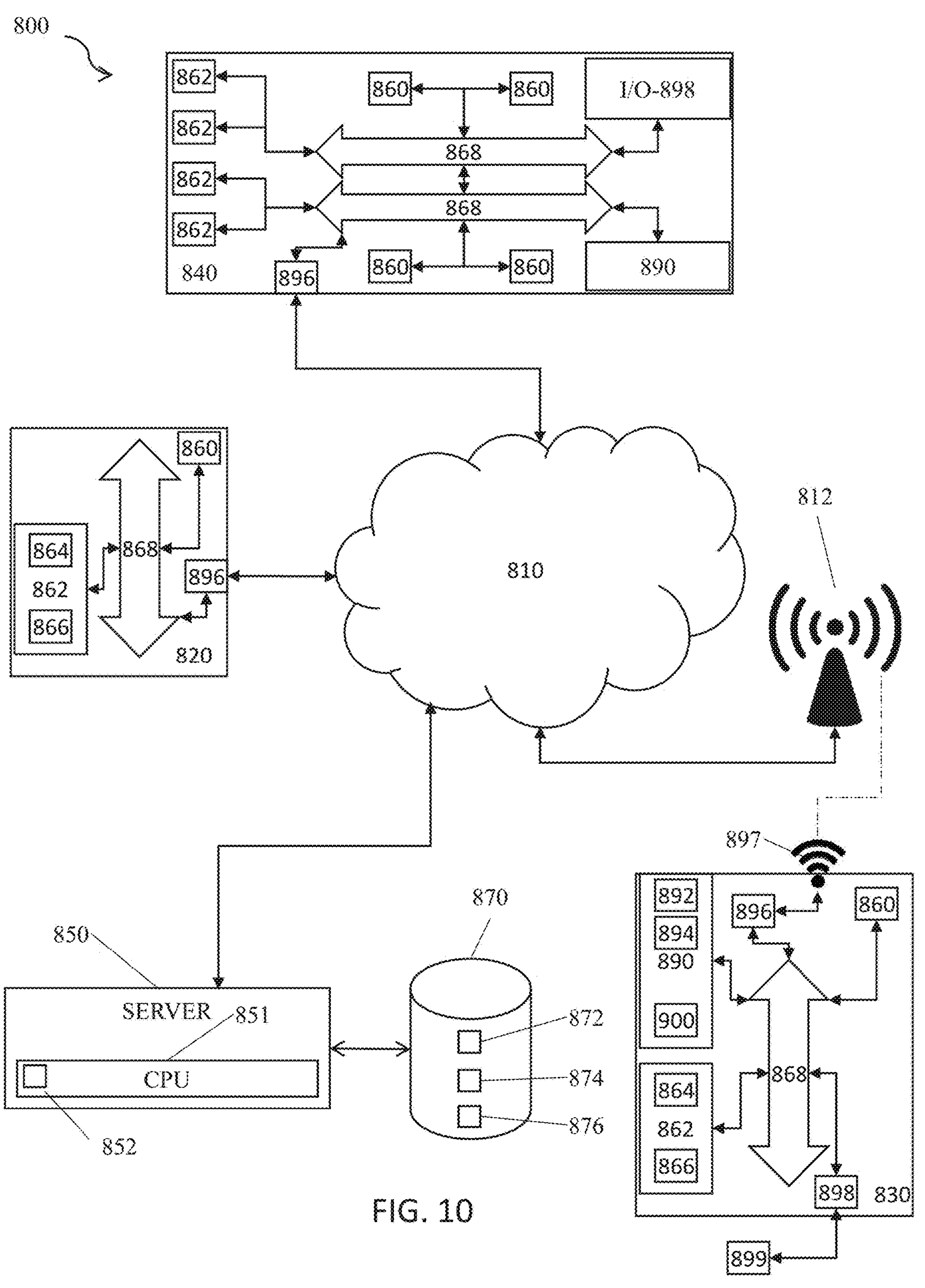
FIG. 10 is a schematic diagram of a system of the present invention.

FIG. 10 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 10, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 10, is operable to include other components that are not explicitly shown in FIG. 10, or is operable to utilize an architecture completely different than that shown in FIG. 10. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in The Business of Blockchain by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the EIP-20: ERC-20 Token Standard, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COINBASE, and/or payments platforms associated with financial institutions.

Tokenization

In one embodiment, the platform is operable to tokenize assets. A token is a piece of data that is stored on the distributed digital ledger and that can be used to represent a physical and/or a digital asset, e.g., in a transaction, in an inventory. The token is not the asset itself; however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, EIP-721: ERC-721 Non-Fungible Token Standard by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for delegation of a confederated right on a distributed ledger, comprising:

executing a smart contract by a root wallet on the distributed ledger to execute and record a root right;

executing a second smart contract by the root wallet on the distributed ledger to execute and record an immutable right;

delegating by the root wallet the immutable right from the root wallet to a delegate wallet on the distributed ledger to create a delegate right, wherein the delegate right enables the delegate wallet to have a right to perform at least one delegate function corresponding to at least one function associated with the root right; and recording a data entry by the root wallet in a delegation registry.

2. The method of claim 1, further comprising removing the data entry by the root wallet from the delegation registry to revoke the delegate right or changing the data entry in the delegation registry to reassign the delegation right.

3. The method of claim 1, further comprising delegating by the delegate wallet the delegate right to a second delegate wallet, wherein the second delegate wallet derives the right to perform the at least one delegate function from the delegate wallet, wherein the delegate wallet records a second data entry in the delegation registry.

4. The method of claim 3, further comprising removing the second data entry by the root wallet or the delegate wallet from the delegation registry to revoke the right to perform the at least one delegate function from the second delegate wallet.

5. The method of claim 3, further comprising removing the data entry by the root wallet from the delegation registry or changing the data entry by the root wallet in the delegation registry to revoke the right to perform the at least one delegate function from the delegate wallet, wherein revoking the right to perform the at least one delegate function from the delegate wallet results in revocation of the right to perform the at least one delegate function from the second delegate wallet.

6. The method of claim 1, further comprising enforcing at least one policy by the delegate wallet, wherein the at least one policy enforces one or more rules for delegation of the right to perform the at least one delegate function.

7. The method of claim 1, further comprising verifying by the root wallet an eligibility of the delegate wallet before delegating the immutable right from the root wallet to the delegate wallet.

8. The method of claim 1, further comprising automating at least one transaction by the delegate wallet on the distributed ledger, wherein the delegate right enables the delegate wallet to authorize the at least one transaction.

9. A computer system for delegation of confederated rights in a decentralized computing network including a distributed ledger, comprising:

at least one computer processor;

a root right expressed in a smart contract code; and at least one memory device having computer readable instructions stored thereon which are configured to be executed by the at least one computer processor;

wherein a root wallet contains a tokenized asset;

wherein the root wallet accesses the distributed ledger and deploys at least one smart contract to execute and record the root right;

wherein the root wallet deploys the at least one smart contract to execute and record at least one core role;

wherein the root wallet deploys the at least one smart contract to execute and record at least one system wallet, wherein the at least one system wallet is authorized to assign the at least one core role to at least one delegate wallet;

wherein the at least one core role contains an immutable right; and wherein the at least one delegate wallet is authorized to sign a transaction for the tokenized asset, execute at least one function to indicate the authorization to execute the function, or create a delegate attribute associated with the tokenized asset.

10. The system of claim 9, wherein the at least one system wallet executes the at least one smart contract for creating at least one eligibility attestation, wherein the at least one delegate wallet receives the at least one eligibility attestation, wherein the at least one eligibility attestation verifies eligibility of the at least one delegate wallet to perform the at least one function to allow signing the transaction for the tokenized asset, the at least one function to indicate the authorization to execute the delegate function, and the at least one function to allow creating the delegate attribute associated with the immutable right.

11. The system of claim 10, wherein the at least one core role is saved as an attestation in an attestation registry, wherein upon delegation of the at least one core role to the at least one delegate wallet, the at least one core role is saved as a role attribute of the at least one delegation wallet in an attribute registry.

12. The system of claim 10, wherein the root wallet records a data entry in a delegation registry, and wherein the at least one delegate wallet delegates the at least one core role to a second delegate wallet, wherein the delegate wallet records a second data entry in the delegation registry.

13. The system of claim 12, wherein the root wallet or the at least one delegate wallet removes the second data entry from the delegation registry or changes the second data entry in the delegation registry to revoke a right to perform at least one delegate function from the second delegate wallet.

14. The system of claim 12, wherein the root wallet removes the data entry from the delegation registry or changes the data entry in the delegation registry to revoke the at least one core role from the at least one delegate wallet, wherein revoking the at least one core role from the at least one delegate wallet results in revocation of the at least one core role from the second delegate wallet.

15. The system of claim 9, wherein the decentralized computing network includes at least one predetermined strategy, wherein the at least one predetermined strategy includes at least one rights transfer process including a series of transfers of the immutable right.

16. A method for distribution of a confederated right on a distributed ledger, comprising:

executing a smart contract by a root wallet on the distributed ledger to execute and record a root right;

assigning by the root wallet a system role attestation to a system wallet;

executing by the system wallet the smart contract for creating at least one role attestation;

assigning by the system wallet the at least one role attestation to a delegate wallet;

saving the at least one role attestation as a role attribute in the attribute registry;

recording a data entry by the system wallet in the attribute registry, wherein the attribute registry records the role attribute of the at least one role attestation from the system wallet to the delegate wallet;

creating a delegate attribute by the delegate wallet;

creating a context by the delegate wallet, wherein the context is stored in a context registry;

creating a policy by the delegate wallet, wherein the policy is stored in a policy registry; and developing by the delegate wallet a smart contract object, wherein the smart contract object is stored in a contract registry.

17. The method of claim 16, wherein the root right includes at least one function to allow signing a transaction for an asset, at least one function to indicate authorization to execute a delegate function, and at least one function to allow creating a system attribute associated with the asset.

18. The method of claim 16, wherein the at least one role attestation includes at least one function to allow signing a transaction for the asset, at least one function to indicate the authorization to execute the delegate function, or at least one function to allow creating a role attribute associated with the asset.

19. The method of claim 16, further comprising executing the smart contract by the system wallet for creating at least one eligibility attestation, receiving the at least one eligibility attestation by the delegate wallet, wherein the at least one eligibility attestation verifies eligibility of the delegate wallet to perform the at least one function to allow signing the transaction for the asset, the at least one function to indicate the authorization to execute the delegate function, or the at least one function to allow creating the delegate attribute associated with the asset.

20. The method of claim 16, further comprising the attribute registry, the context registry, the policy registry, or the contract registry including at least one policy which enforces at least one rule.

* * * * *